US012645714B2

(12) United States Patent
Malleshaiah et al.

(10) Patent No.: US 12,645,714 B2
(45) Date of Patent: Jun. 2, 2026

(54) ARTIFICIAL INTELLIGENCE (AI) AGENT INPUTS USING USER INTERFACES (UIs)

(71) Applicant: Zscaler, Inc., San Jose, CA (US)

(72) Inventors: Prasannakumar Jobigenahally Malleshaiah, San Jose, CA (US); Valentin Khechinashvili, Alamo, CA (US); Francisco Javier Rodriguez Gonzalez, San Francisco, CA (US); Shriyash Shete, Bloomington, IN (US); Akshay Yelmar, San Jose, CA (US); Hanchen Xiong, London (GB)

(73) Assignee: Zscaler, Inc., San Jose, CA (US)

( * ) Notice: Subject to any disclaimer, the term of this patent is extended or adjusted under 35 U.S.C. 154(b) by 19 days.

(21) Appl. No.: 18/915,597

(22) Filed: Oct. 15, 2024

(65) Prior Publication Data

US 2025/0371057 A1     Dec. 4, 2025

Related U.S. Application Data

(60) Provisional application No. 63/655,724, filed on Jun. 4, 2024.

(51) Int. Cl.
| | |
|---|---|
| *G06F 16/00* | (2019.01) |
| *G06F 3/0483* | (2013.01) |
| *G06F 3/04842* | (2022.01) |
| *G06F 16/332* | (2019.01) |
| *G06F 16/3329* | (2025.01) |
| *G06F 16/335* | (2019.01) |
| *G06F 16/338* | (2019.01) |
| *G06F 40/134* | (2020.01) |
| *G06T 11/26* | (2026.01) |
| *G06T 11/60* | (2006.01) |

(52) U.S. Cl.
CPC ...... *G06F 16/33295* (2025.01); *G06F 3/0483* (2013.01); *G06F 3/04842* (2013.01); *G06F 16/3322* (2019.01); *G06F 16/335* (2019.01); *G06F 16/338* (2019.01); *G06F 40/134* (2020.01); *G06T 11/26* (2026.01); *G06T 11/60* (2013.01); *G06T 2200/24* (2013.01)

(58) Field of Classification Search
CPC .............................. G06F 16/00; G06F 16/335
See application file for complete search history.

(56) References Cited

U.S. PATENT DOCUMENTS

| | | | |
|---|---|---|---|
| 2018/0123995 A1* | 5/2018 | Xue ...................... | G06F 16/248 |
| 2022/0278889 A1 | 9/2022 | Malleshaiah et al. | |
| 2023/0396512 A1 | 12/2023 | Malleshaiah et al. | |
| 2024/0039954 A1 | 2/2024 | Shete et al. | |
| 2024/0064178 A1 | 2/2024 | Shete et al. | |
| 2024/0163312 A1 | 5/2024 | Azad et al. | |
| 2024/0205231 A1 | 6/2024 | Bardhan et al. | |
| 2025/0061141 A1* | 2/2025 | Neervannan ........ | G06F 16/3344 |

* cited by examiner

*Primary Examiner* — Cheryl Lewis
(74) *Attorney, Agent, or Firm* — Baratta Law PLLC; Lawrence A. Baratta, Jr.; Ryan Odessa

(57)     ABSTRACT

Systems and methods for Artificial Intelligence (AI) agent inputs using User Interfaces (UIs) includes operating an Artificial Intelligence (AI) agent system that includes an agent core connected to memory, one or more tools, and a planner; receiving an input from a user, wherein the input includes any of a prompt from the user and a selection from a User Interface (UI); and generating, via the AI agent, an answer based on the input.

20 Claims, 20 Drawing Sheets

400

TOOLS
408

USER REQUEST
410

AGENT CORE
402

MEMORY
404

PLANNER
406

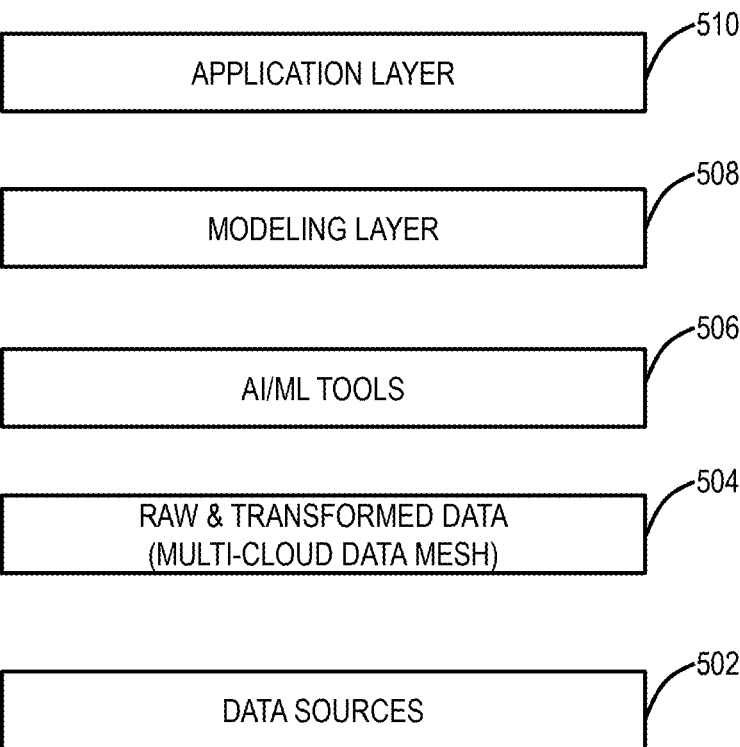
APPLICATION LAYER ⟋510
MODELING LAYER ⟋508
AI/ML TOOLS ⟋506
RAW & TRANSFORMED DATA
(MULTI-CLOUD DATA MESH) ⟋504
DATA SOURCES ⟋502
FIG. 6

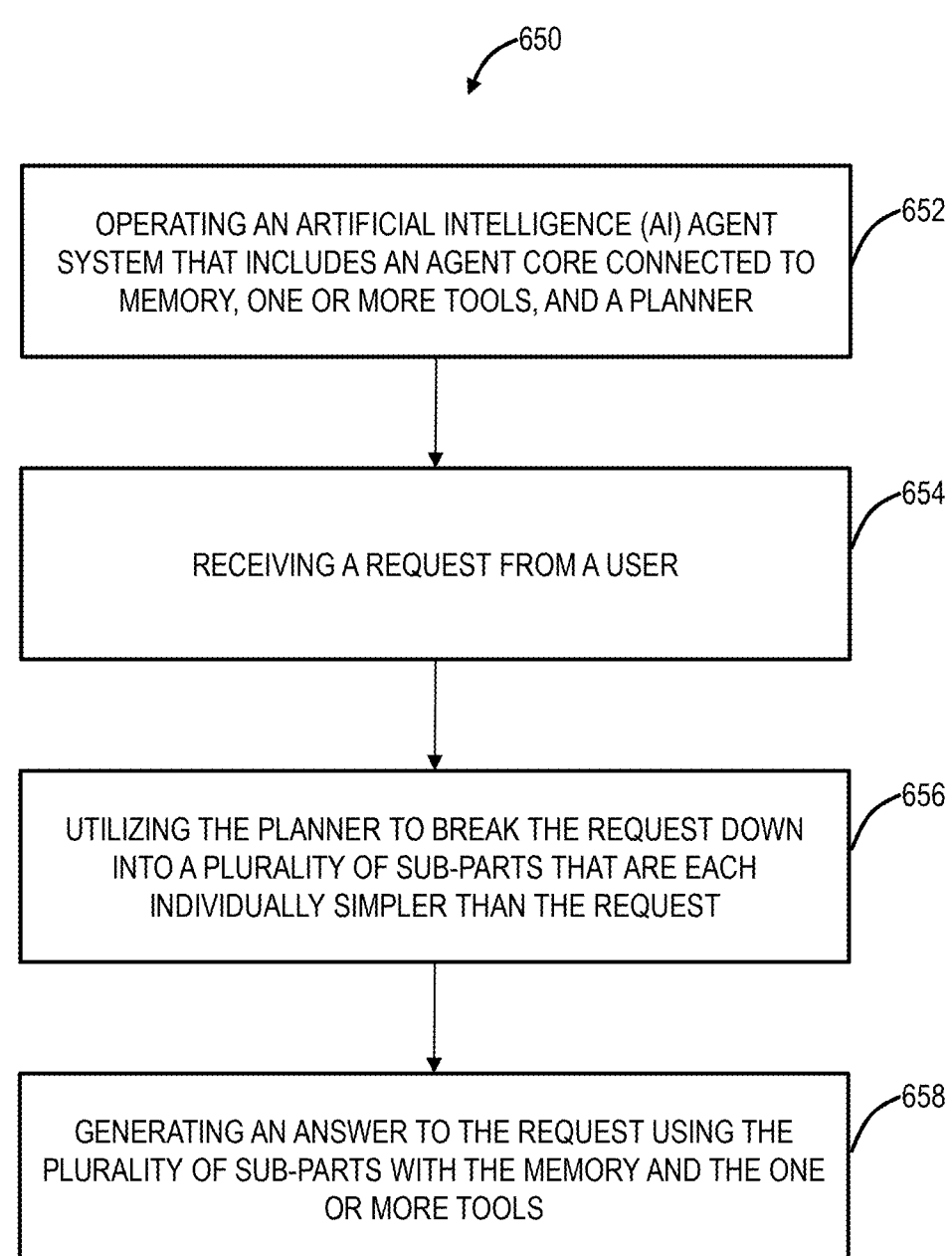

650

OPERATING AN ARTIFICIAL INTELLIGENCE (AI) AGENT SYSTEM THAT INCLUDES AN AGENT CORE CONNECTED TO MEMORY, ONE OR MORE TOOLS, AND A PLANNER — 652

RECEIVING A REQUEST FROM A USER — 654

UTILIZING THE PLANNER TO BREAK THE REQUEST DOWN INTO A PLURALITY OF SUB-PARTS THAT ARE EACH INDIVIDUALLY SIMPLER THAN THE REQUEST — 656

GENERATING AN ANSWER TO THE REQUEST USING THE PLURALITY OF SUB-PARTS WITH THE MEMORY AND THE ONE OR MORE TOOLS — 658

752
OPERATING AN ARTIFICIAL INTELLIGENCE (AI) AGENT SYSTEM THAT INCLUDES AN AGENT CORE CONNECTED TO MEMORY, ONE OR MORE TOOLS, AND A PLANNER

754
RECEIVING A REQUEST FROM A USER

756
GENERATING, VIA THE AI AGENT, AN ANSWER TO THE REQUEST USING A PLURALITY OF INPUTS RELATED TO USER EXPERIENCE OF ONE OR MORE USERS ASSOCIATED WITH A TENANT OF A CLOUD-BASED SYSTEM

850

OPERATING AN ARTIFICIAL INTELLIGENCE (AI) AGENT SYSTEM THAT INCLUDES AN AGENT CORE CONNECTED TO MEMORY, ONE OR MORE TOOLS, AND A PLANNER — 852

RECEIVING A REQUEST FROM A USER — 854

GENERATING, VIA THE AI AGENT, A RESPONSE INCLUDING AN INTERACTIVE DATA VISUALIZATION BASED ON THE REQUEST — 856

950

OPERATING AN ARTIFICIAL INTELLIGENCE (AI) AGENT SYSTEM THAT INCLUDES AN AGENT CORE CONNECTED TO MEMORY, ONE OR MORE TOOLS, AND A PLANNER

952

RECEIVING AN INPUT FROM A USER, WHEREIN THE INPUT INCLUDES ANY OF A PROMPT FROM THE USER AND A SELECTION FROM A USER INTERFACE (UI)

954

GENERATING, VIA THE AI AGENT, AN ANSWER BASED ON THE INPUT

956

ARTIFICIAL INTELLIGENCE (AI) AGENT INPUTS USING USER INTERFACES (UIs)

CROSS-REFERENCE TO RELATED APPLICATION(S)

The present disclosure claims priority to U.S. Provisional Patent Application No. 63/655,724, filed Jun. 4, 2024, entitled "AI for managing user experience" the contents of which are incorporated by reference in their entirety.

FIELD OF THE DISCLOSURE

The present disclosure generally relates to machine learning, artificial intelligence, and cloud-based network security. More particularly, the present disclosure relates to systems and methods for Artificial Intelligence (AI) agent inputs using User Interfaces (UIs).

BACKGROUND OF THE DISCLOSURE

Network issues are a common challenge in both personal and professional environments, often leading to disruptions in connectivity, slow internet speeds, or complete outages. These issues can stem from a variety of sources, including hardware failures, software conflicts, configuration errors, or external factors like service provider outages. In an IT setting, when users encounter network problems, they typically submit IT tickets to report the issue to the technical support team. These tickets serve as formal requests for assistance and provide details about the problem, helping IT professionals diagnose and resolve the issue. However, the process of handling IT tickets can be time-consuming, especially if the problem is complex or affects multiple users. Efficiently managing and resolving these network issues is crucial for minimizing downtime and ensuring that systems and services remain operational. Based thereon, the present disclosure provides an intelligent digital experience AI assistant for end users, allowing users to quickly and effectively resolve issues relating to their devices and networks.

BRIEF SUMMARY OF THE DISCLOSURE

The present disclosure relates to systems and methods for Artificial Intelligence (AI) agent inputs using User Interfaces (UIs). The present disclosure includes methods having steps, processing devices configured to implement the steps, a cloud-based system configured to implement the steps, and as a non-transitory computer-readable medium storing instructions for programming one or more processors to execute the steps. The steps include operating an Artificial Intelligence (AI) agent system that includes an agent core connected to memory, one or more tools, and a planner; receiving an input from a user, wherein the input includes any of a prompt from the user and a selection from a User Interface (UI); and generating, via the AI agent, an answer based on the input.

The steps can further include wherein the input includes a highlighted section of the UI and a prompt from the user. The answer can be based on the highlighted section of the UI and a prompt from the user. Prior to receiving the input from the user, the steps can include displaying an AI agent UI input symbol, thereby providing the user with an option to select one or more elements within the UI as input. Responsive to the user selecting the AI agent UI input symbol, the steps can include allowing the user to select one or more elements within the UI; and generating an answer responsive to one or more elements being selected, the answer being based on the one or more elements. The answer can be specific to the one or more elements, wherein the answer includes an explanation of data associated with the one or more elements, and one or more remedial action recommendations responsive to the one or more elements being associated with an issue. The steps can further include receiving an input, the input being a highlighted section of the UI; receiving a second input, the second input being a request from the user; and generating an answer to the request based on the highlighted section of the UI.

BRIEF DESCRIPTION OF THE DRAWINGS

The present disclosure is illustrated and described herein with reference to the various drawings, in which like reference numbers are used to denote like system components/method steps, as appropriate, and in which:

FIG. 6 is a logical diagram of an AI platform that can provide AI functionality with one or more cloud services.

FIG. 9 is a flowchart of an AI agent process.

DETAILED DESCRIPTION OF THE DISCLOSURE

Cybersecurity Monitoring and Protection Examples

Figure 1A:
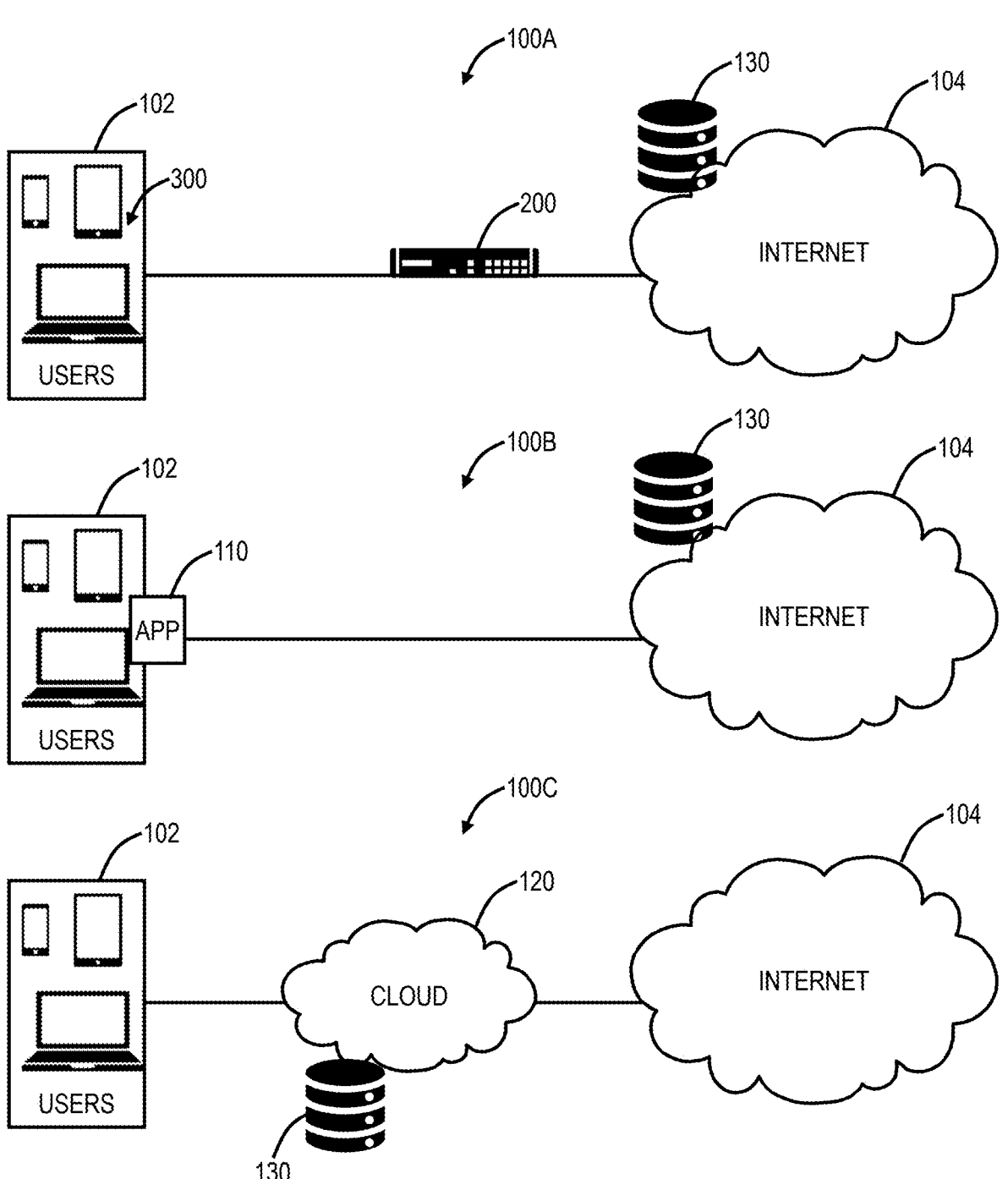
FIG. 1A is a network diagram of three example network configurations of cybersecurity monitoring and protection of a user.
Figure 2:
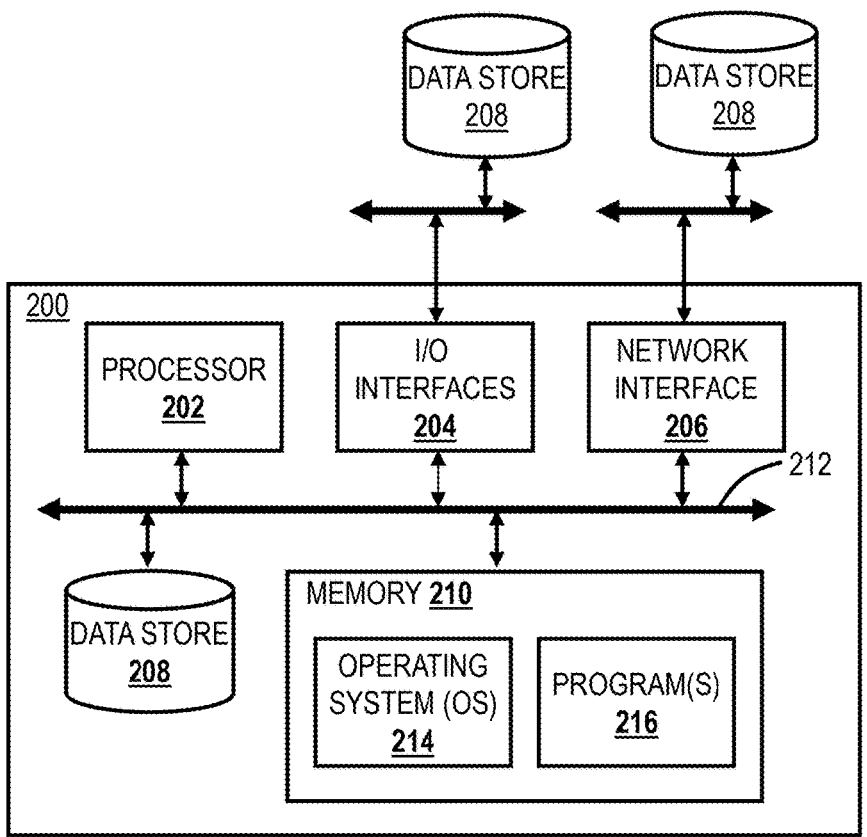
FIG. 2 is a block diagram of a server.

FIG. 1A is a network diagram of three example network configurations 100A, 100B, 100C of cybersecurity monitoring and protection of an endpoint 102. Those skilled in the art will recognize these are some examples for illustration purposes, there may be other approaches to cybersecurity monitoring (as well as providing generalized services), and these various approaches can be used in combination with one another as well as individually. Also, while shown for a single endpoint 102, practical embodiments will handle a large volume of endpoints 102, including multi-tenancy. In this example, the endpoint 102 communicates on the Internet 104, including accessing cloud services, Software-as-a-Service, etc. (each may be offered via computing resources, such as, e.g., using one or more servers 200 as illustrated in FIG. 2).

Note, the term endpoint 102 is used herein to refer to any computing device (see FIG. 3 for an example computing device 300) which can communicate on a network. The endpoint 102 can be associated with a user and include laptops, tablets, mobile phones, desktops, etc. Further, the endpoint can also mean machines, workloads, IoT devices, or simply anything associated with the company that connects to the Internet, a Local Area Network (LAN), etc.

As part of offering cybersecurity through these example network configurations 100A, 100B, 100C, there is a large amount of cybersecurity data obtained. Various embodiments of the present disclosure focus on using this cybersecurity data along with a customer's data to perform various security tasks including developing customer machine learning models and other security platforms of the like.

The network configuration 100A includes a server 200 located between the endpoint 102 and the Internet 104. For example, the server 200 can be a proxy, a gateway, a Secure Web Gateway (SWG), Secure Internet and Web Gateway, Secure Access Service Edge (SASE), Secure Service Edge (SSE), Cloud Application Security Broker (CASB), etc. The server 200 is illustrated located inline with the endpoint 102 and configured to monitor the endpoint 102. In other embodiments, the server 200 does not have to be inline. For example, the server 200 can monitor requests from the endpoint 102 and responses to the endpoint 102 for one or more security purposes, as well as allow, block, warn, and log such requests and responses. The server 200 can be on a local network associated with the endpoint 102 as well as external, such as on the Internet 104. Also, while described as a server 200, this can also be a router, switch, appliance, virtual machine, etc. The network configuration 100B includes an application 110 that is executed on the computing device 300. The application 110 can perform similar functionality as the server 200, as well as coordinated functionality with the server 200 (a combination of the network configurations 100A, 100B). Finally, the network configuration 100C includes a cloud service 120 configured to monitor the endpoint 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the endpoints 102, using signatures sourced and constantly updated. The DNS security can identify and route command-and-control connections to threat detection engines for full content inspection. The DLP can use standard and/or custom dictionaries to continuously monitor the endpoints 102, including compressed and/or Transport Layer Security (TLS) or Secure Sockets Layer (SSL)-encrypted traffic.

In typical embodiments, the network configurations 100A, 100B, 100C can be multi-tenant and can service a large volume of the endpoints 102. Newly discovered threats can be promulgated for all tenants practically instantaneously. The endpoints 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of endpoints 102 under management by an IT group, department, administrator, etc., i.e., some group of endpoints 102 that are managed together. One advantage of multi-tenancy is the visibility of cybersecurity threats across a large number of endpoints 102, across many different organizations, across the globe, etc. This provides a large volume of data to analyze, use machine learning techniques on, develop comparisons, etc. The present disclosure can use the term "service provider" to denote an entity providing the cybersecurity monitoring and a "customer" as a company (or any other grouping of endpoints 102).

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own endpoints 102 and configuration, policy, rules, etc.

Cloud Monitoring

The cloud 120 can scale cybersecurity monitoring and protection with near-zero latency on the endpoints 102. Also, the cloud 120 in the network configuration 100C can be used with or without the application 110 in the network configuration 100B and the server 200 in the network configuration 100A. Logically, the cloud 120 can be viewed as an overlay network between endpoints 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the endpoints 102, as well as independent of platform, operating system, network access technique, network access provider, etc.

There are various techniques to forward traffic between the endpoints 102 and the cloud 120. A key aspect of the cloud 120 (as well as the other network configurations 100A, 100B) is that all traffic between the endpoints 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services are also contemplated.

Zero Trust

Figure 1B:
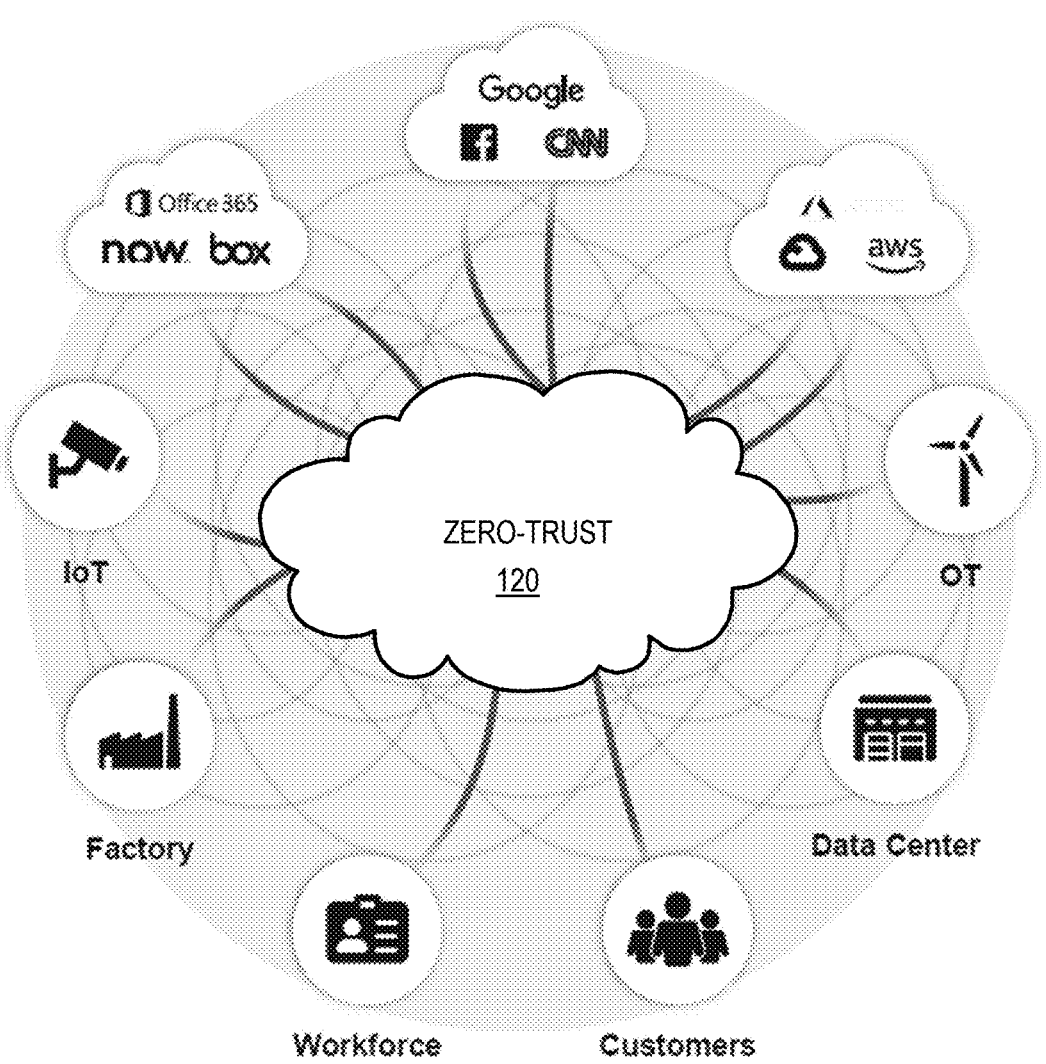
FIG. 1B is a logical diagram of the cloud operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120. Zero trust is a cybersecurity strategy where security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multi-factor authentication (MFA) approaches beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Log Data

With the cloud 120 as well as any of the network configurations 100A, 100B, 100C, the log data 130 can include a rich set of statistics, logs, history, audit trails, and the like related to various endpoint 102 transactions. Generally, this rich set of data can represent activity by an endpoint 102. This information can be for multiple endpoints 102 of a company, organization, etc., and analyzing this data can provide a wealth of information as well as training data for machine learning models.

The log data 130 can include a large quantity of records used in a backend data store for queries. A record can be a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active endpoints 102 or more. Examples of the sparsely populated log data can be the Nanolog system from Zscaler, Inc., the applicant.

Also, such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is that the cybersecurity monitoring is rich and provides a wealth of information to determine various assessments of cybersecurity. In some embodiments, the log data 130 can be referred to as weblogs or the like. Of note, with various cybersecurity monitoring techniques via the network configurations 100A, 100B, 100C, as well as with other network configurations, the log data 130 is a rich repository of endpoint 102 activity. Unlike websites, specific cloud services, application providers, etc., cybersecurity monitoring can log almost all of a user's 102 activity. That is, the log data 130 is not merely confined to specific activity (e.g., a user's 102 social networking activity on a specific site, a user's 102 search requests on a specific search engine, etc.).

Example Server Architecture

FIG. 2 is a block diagram of a server 200, which may be used as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc.

Example Computing Device Architecture

Figure 3:
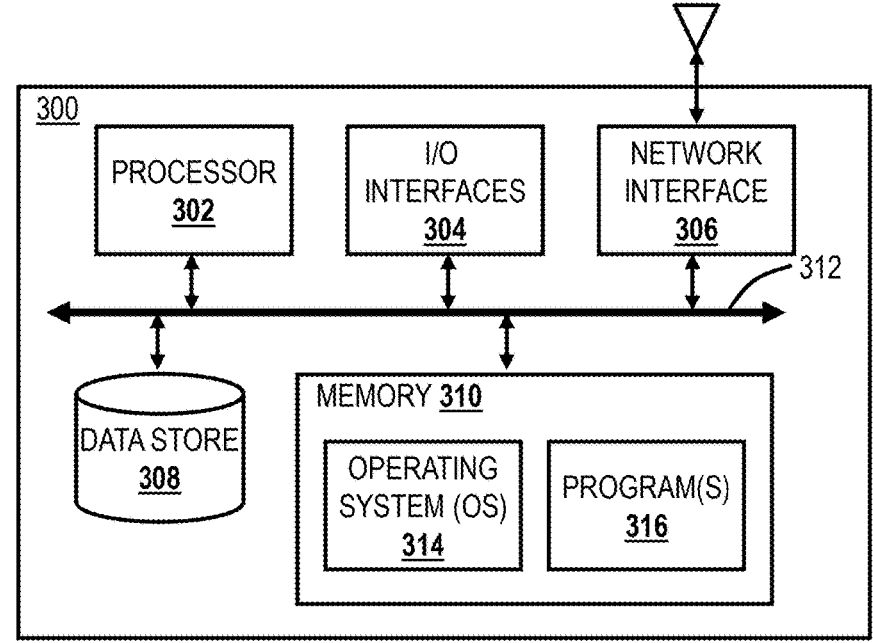
FIG. 3 is a block diagram of a computing device.

FIG. 3 is a block diagram of a computing device 300, which may be realize an endpoint 102. Specifically, the computing device 300 can form a device used by one of the endpoints 102, and this may include common devices such as laptops, smartphones, tablets, netbooks, personal digital assistants, cell phones, e-book readers, Internet-of-Things (IoT) devices, servers, desktops, printers, televisions, streaming media devices, storage devices, and the like, i.e., anything that can communicate on a network. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the computing device 300. For example, example programs 316 may include, but not limited to, a web browser, social networking applications, streaming media applications, games, mapping and location applications, electronic mail applications, financial applications, and the like. The application 110 can be one of the example programs.

Application for Traffic Forwarding and Monitoring

Again, the network configuration 100B includes an application 110 that is executed on the computing device 300. The application 110 can perform similar functionality as the server 200, as well as coordinated functionality with the server 200 (a combination of the network configurations 100A, 100B). Of course, various embodiments are contemplated herein, including combinations of the network configurations 100A, 100B, 100C together. For example, the application 110 can perform similar functionality as the cloud 120, as well as coordinated functionality with the cloud 120.

Figure 4:
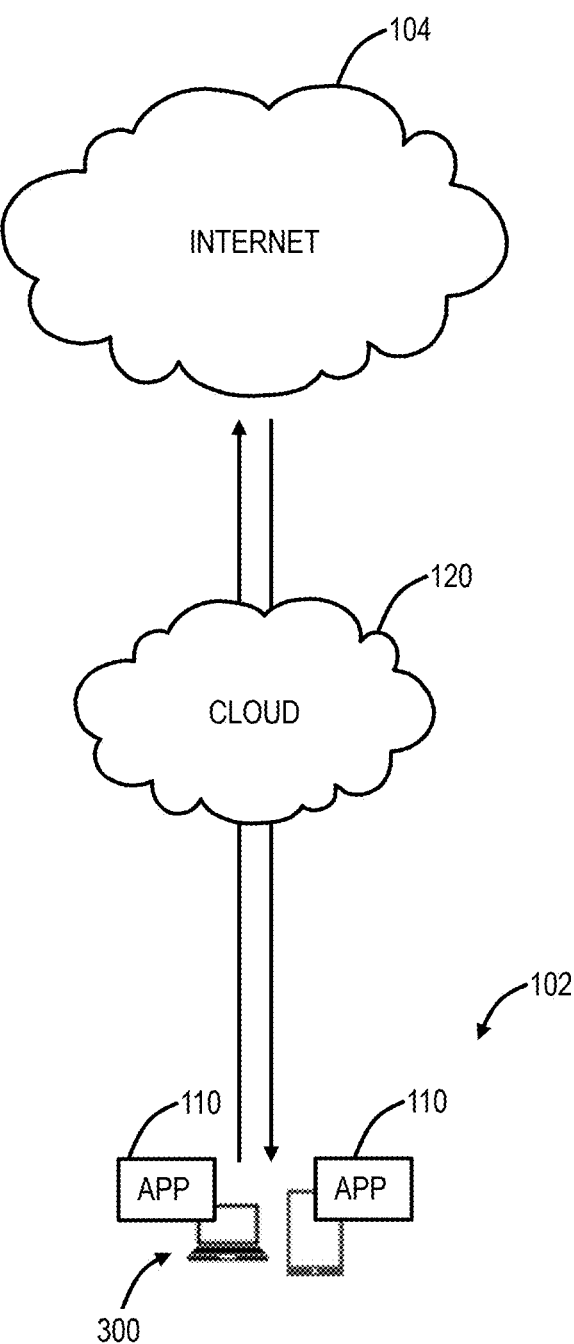
FIG. 4 is a diagram of an exemplary network configuration illustrating an application on computing devices configured to operate through the cloud.

FIG. 4 is a network diagram of an exemplary network configuration illustrating an application 110 on computing devices 300 configured to operate through the cloud 120. Different types of computing devices 300 are proliferating, including Bring Your Own Device (BYOD) as well as IT-managed devices. The conventional approach for a computing device 300 to operate with the cloud 120 as well as for accessing enterprise resources includes complex policies, VPNs, poor user experience, etc. The application 110 can automatically forward user traffic with the cloud 120 as well as ensuring that security and access policies are enforced, regardless of device, location, operating system, or application. The application 110 automatically determines if a user 102 is looking to access the open Internet 104, a SaaS app, or an internal app running in public, private, or the datacenter and routes mobile traffic through the cloud 120. The application 110 can support various cloud services, including ZIA, ZPA, ZDX, etc., allowing the best in class security with zero trust access to internal applications. As described herein, the application 110 can also be referred to as a connector application.

example, the lightweight tunnel can be HTTP-based. With the application 110, there is no requirement for PAC files, an IPSec VPN, authentication cookies, or user 102 setup.

AI Agents

Again, the present disclosure relates to systems and methods for next generation AI agents for end users. In this disclosure, we examine the role of AI agents as a way to link LLMs with backend systems. Then, we look at how the use of intuitive, interactive semantics to comprehend user intent can set up AI agents as the next generation user interface and user experience (UI/UX). Finally, with upcoming AI agents in software, we show why we need to bring back some principles of software engineering that people seem to have forgotten in the past few months.

The next generation AI agents described herein can be used as a copilot for cloud services, including cybersecurity services. Some specific areas include:

TABLE 1

Generative AI feature and Software-as-a-Service (SaaS) procurement.
Use Case evaluation and Return on Investment (ROI) evaluation.
Project Portfolio Management.
Perform exploratory data analysis to understand ecosystems, behavioral trends, and long-term trends.
Build machine learning models (training, validation, and testing) with appropriate solutions for data reduction, sampling, feature selection, and feature engineering.
Design and evaluate experiments (including hypothesis testing) by creating key data sets.
Apply data mining or NLP techniques to cleanse and prepare large data sets.
Defining and socializing best practices.
Regularly measure analytics.
Create and maintain production models and related applications.
Develop enterprise Advanced Analytics, AI/ML as a service and MLOps strategy.
Develop Data Platform enhancements or vendor selection requirements for AI/ML workbench/platform.
Improve predictive models with data from multiple models.
Automate feedback loops for algorithms/models in production.
Create repeatable processes and scalable data products.
Influence functional teams and develop best practices across the organization.
Review, scale, and enhance operationalized statistical models and algorithms.
Empower end users to debug and resolve issues with their devices through conversational assistance.
Other use cases include, but are not limited to: account scoring, propensity to buy, customer segmentation, sentiment analysis, customer churn and uplift prediction, hypothesis testing and forecasting models.

The application 110 is configured to auto-route traffic for seamless user experience. This can be protocol as well as application-specific, and the application 110 can route traffic with a nearest or best fit node of the cloud 120. Further, the application 110 can detect trusted networks, allowed applications, etc. and support secure network access. The application 110 can also support the enrollment of the computing device 300 prior to accessing applications, the internet, or any services provided by the cloud 120. The application 110 can uniquely detect the users 102 based on fingerprinting the user device 300, using criteria like device model, platform, operating system, device posture, etc. The application 110 can support Mobile Device Management (MDM) functions, allowing IT personnel to deploy and manage the computing devices 300 seamlessly. This can also include the automatic installation of client and SSL certificates during enrollment. Finally, the application 110 provides visibility into device and app usage of the user 102 of the computing device 300.

The application 110 supports a secure, lightweight tunnel between the computing device 300 and the cloud 120. For LLMs offer a more intuitive, streamlined approach to UI/UX interactions compared to traditional point-and-click methods. Seemingly straightforward requests can trigger a series of complex interactions in applications, potentially spanning several minutes of interactions using normal UI/UX. For example, one would probably have to choose a category, perform searches, perform checks, and then potentially find an answer.

We Need More than LLMs

LLMs are AI models trained on vast amounts of textual data, enabling them to understand and generate remarkably accurate human-like language. Models such as OpenAI's GPT-3 have demonstrated exceptional abilities in natural language processing, text completion, and even generating coherent and contextually relevant responses.

Although more recent LLMs can do data analysis, summary, and representation, the ability to connect external data sources, algorithms, and specialized interfaces to an LLM gives it even more flexibility. This can enable it to perform tasks that involve analysis of domain-specific real-time data, as well as open the door to tasks not yet possible with today's LLMs.

Various examples illustrate the complexity of natural language processing (NLP) techniques. Even relatively simple requests necessitate connecting with multiple back-end systems, such as databases, inventory management systems, tracking systems, and more. Each of these connections contributes to the successful execution of the order.

Furthermore, the connections required may vary depending on the request. The more flexibility one necessitates from the system, the more connections it needs with different backends. This flexibility and adaptability in establishing connections is crucial to accommodate diverse customer requests and ensure a seamless experience.

AI Agents

LLMs serve as the foundation for AI agents. According to their definition, an AI agent is a sophisticated system that employs an LLM to process and reason about a specific domain. To generate an answer, the AI agent leverages auxiliary systems in conjunction with the LLM. These auxiliary systems support the agent in comprehending the domain and facilitating the creation of accurate responses.

Figure 5:
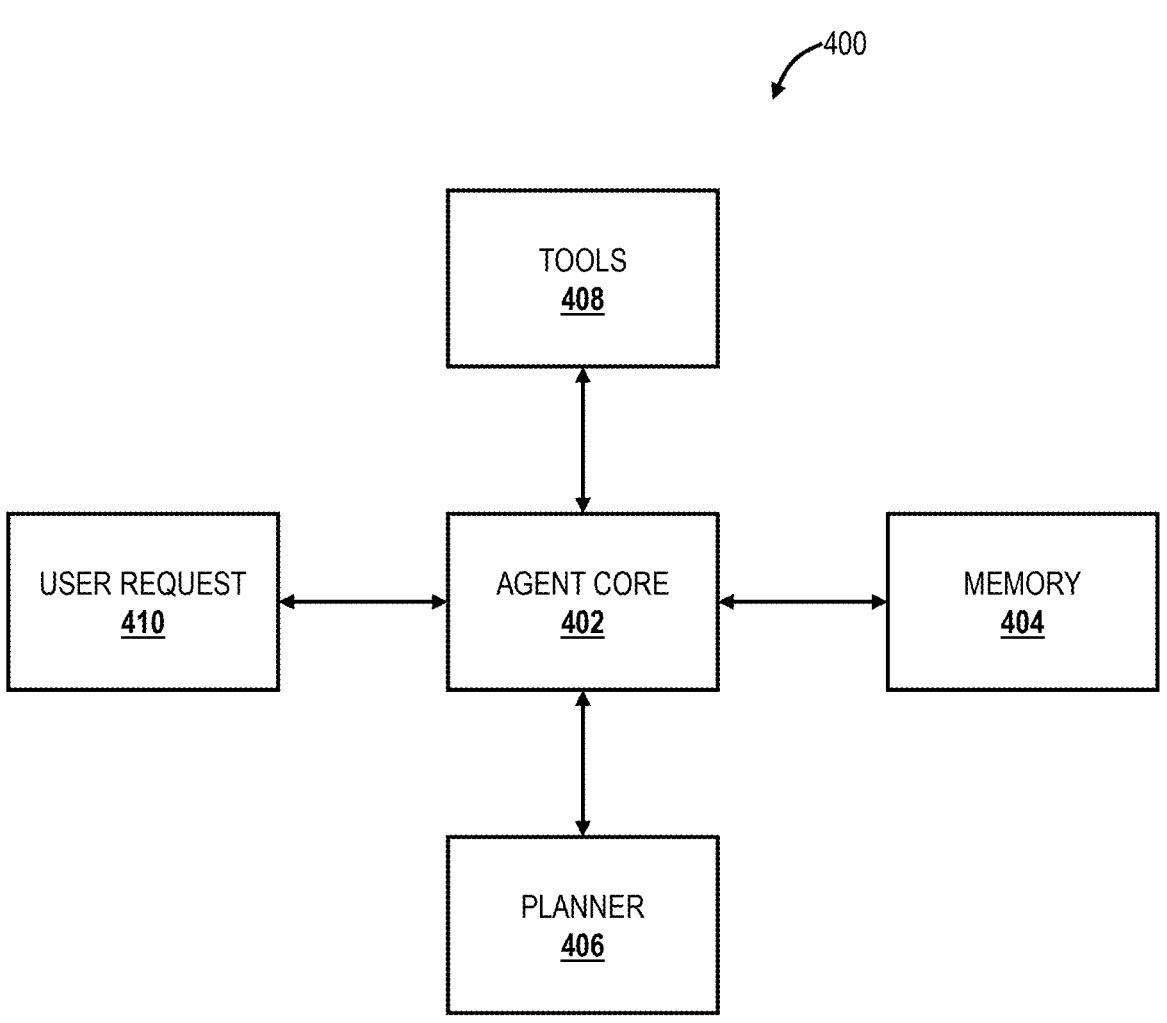
FIG. 5 is a block diagram of an AI agent.

FIG. 5 is a block diagram of an AI agent 400. The AI agent 400 includes several integral components or modules, such as an agent core 402, a memory module 404, a planner component 406, tools 408, and a user request 410. Note, these components or modules 402, 404, 406, 408, 410 are implemented via compute resources. The agent core 402 forms the central component and is responsible for orchestrating the agent's 400 overall functionality. The memory module 404 enables the agent 400 to store and retrieve relevant information, enhancing its ability to retain context and make informed decisions. The planner component 406 guides the agent's 400 actions by formulating a strategic course of action based on the given problem or task. Various additional tools 408 and resources assist the agent in performing specific tasks or functions within the defined domain. The user request 410 provides the UI/UX interface to the agent 400. These components collaboratively enable AI agents 400 to effectively process information, reason, and generate responses in a manner aligned with their designated purpose.

Agent Core

The agent core 402 plays a central role in orchestrating the AI agent's 400 overall functionality. It serves as the control center, managing decision-making processes, communication, and coordination of various modules and subsystems within the agent 400. The primary function of the agent core 402 is to facilitate the seamless operation of the AI agent 400 and ensure efficient interaction with the environment or the tasks at hand.

The agent core 402 acts as the interface between the AI agent 400 and its surroundings. It receives inputs from the environment or external systems, processes the information, and generates appropriate actions or responses. This involves employing various algorithms, heuristics, or decision-making mechanisms to analyze the received data and determine the best course of action. The agent core 402 also handles the coordination of different modules and subsystems within the AI agent 400, ensuring that they work in harmony to achieve the agent's 400 objectives.

Furthermore, the agent core 402 is responsible for managing the agent's 400 internal state. It maintains a representation of the agent's knowledge, beliefs, and intentions, allowing it to reason, plan, and adapt its behavior accordingly. The agent core 402 oversees the update and retrieval of information from the agent's 400 memory 404, enabling it to access relevant knowledge and contextual information during decision-making processes.

Overall, the agent core 402 acts as the brain of an AI agent 400, providing the intelligence, coordination, and control to enable the agent 400 to effectively interact with the environment and perform tasks within the defined domain. It governs the decision-making, communication, and coordination processes, ensuring the agent 400 operates optimally and achieves its objectives.

Memory

The memory module 404 encompasses two important aspects: history memory and context memory. These components work together to store and manage information critical to the agent's 400 operation, allowing it to make informed decisions and maintain a coherent understanding of the environment.

History memory serves as a repository for past interactions and experiences of the AI agent 400. It stores a record of previous inputs, outputs, and the outcomes of actions taken by the agent 400. This historical data enables the agent 400 to learn from past interactions and avoid repeating mistakes. By referring to the history memory, the agent 400 can gain insights into effective strategies, successful outcomes, and patterns in the data that can inform its decision-making process.

Context memory, on the other hand, focuses on maintaining a coherent understanding of the current situation. It stores relevant contextual information that provides the necessary background for the agent 400 to interpret and respond appropriately to the present state. This can include information about the environment, the user's preferences or intentions, and any other contextual factors that influence the agent's 400 behavior. By referencing the context memory, the agent 400 can adapt its actions and responses based on the specific circumstances, enhancing its ability to interact intelligently with the environment.

The integration of history memory and context memory allows the AI agent 400 to leverage both past experiences and current context to inform its decision-making process. By accessing historical data, the agent 400 can learn from its own actions and adjust its strategies accordingly. Simultaneously, the context memory ensures that the agent can adapt its behavior to the present situation, taking into account relevant contextual factors that may influence the decision-making process.

Overall, the memory module 404 serves as a crucial component for storing and managing information. By utilizing the stored data from past interactions and maintaining a coherent understanding of the current context, the agent 400 can make informed decisions, learn from experiences, and effectively navigate the complexities of its environment.

Planner

The planner component 406 plays a crucial role in guiding the agent's 400 actions and formulating a strategic course of action based on the given problem or task. It is responsible for generating a sequence of steps or actions that lead the agent 400 towards achieving its objectives.

The planner component 406 analyzes the current state of the environment, along with any available information or constraints, to determine the most effective sequence of actions to achieve the desired outcome. It considers factors such as goals, resources, rules, and dependencies to generate a plan that optimizes the agent's 400 decision-making process.

An example of a prompt template that can be used by the planner is as follows.

General Instructions

You are a domain expert. Your task is to break down a complex question into simpler sub-parts. If you cannot answer the question, request a helper or use a tool. Fill with Nil where no tool or helper is required.

Available Tools

Search Tool
Math Tool

Contextual Information

<information from Memory to help LLM to figure out the context around question>

User Question

"How to order a margherita pizza in 20 min in my app?"

Answer Format

{"sub-questions": ["<FILL>"]}

The planner component 406 would then utilize this prompt template to generate a plan that outlines specific actions and steps to be taken.

By employing the planner component 406, the AI agent 400 can systematically determine the optimal sequence of actions to achieve its objectives, ensuring efficient decision-making and effective utilization of available resources. The generated plan serves as a roadmap for the agent's 400 actions, enabling it to navigate complex problem spaces and accomplish its goals in a strategic manner.

Tools

In the AI agent 400, the set of tools 408 encompasses various resources and functionalities that assist in performing specific tasks or functions within the defined domain. Here is a list of possible tools 408 that can be utilized in the AI agent 400:

(1) RAG (Retrieval-Augmented Generation): RAG is a tool that combines retrieval-based methods with generative language models. It enables the agent 400 to retrieve relevant information from a knowledge base and utilize it to generate coherent and contextually appropriate responses.

(2) Database connections: Connecting to databases allows the AI agent 400 to access and retrieve information from structured data sources. This tool enables the agent 400 to query and extract relevant data for decision-making or generating responses.

(3) Natural Language Processing (NLP) libraries: NLP libraries provide a range of tools and algorithms for processing and understanding human language. These libraries offer functionalities such as text tokenization, named entity recognition, sentiment analysis, and language modeling, which can enhance the agent's language processing capabilities.

(4) Machine Learning frameworks: Machine learning frameworks, such as TensorFlow or PyTorch, provide tools and algorithms for training and deploying machine learning models. These frameworks enable the agent 400 to leverage various machine learning techniques, including supervised learning, unsupervised learning, or reinforcement learning, to enhance its capabilities.

(5) Visualization tools: Visualization tools assist in representing and interpreting data or model outputs in a visual format. These tools can help the agent 400 understand complex patterns, relationships, or trends in the data, aiding in decision-making and analysis.

(6) Simulation environments: Simulation environments provide a controlled virtual environment where the AI agent 400 can interact and learn without impacting the real world. These tools allow the agent to practice and refine its skills, test different strategies, and evaluate the potential outcomes of its actions.

(7) Monitoring and logging frameworks: Monitoring and logging frameworks facilitate the tracking and recording of agent activities, performance metrics, or system events. These tools assist in evaluating the agent's 400 behavior, identifying potential issues or anomalies, and supporting debugging and analysis.

(8) Data preprocessing tools: Data preprocessing tools help in cleaning, transforming, and preparing raw data before feeding it into the AI agent 400. These tools may include techniques for data cleaning, normalization, feature selection, or dimensionality reduction, ensuring the quality and relevance of data used by the agent 400.

(9) Evaluation frameworks: Evaluation frameworks provide methodologies and metrics to assess the performance and effectiveness of the AI agent 400. These tools enable the agent to measure its success in achieving objectives, compare different approaches, and iterate on its capabilities.

These tools, among others, contribute to the AI agent's 400 toolkit, empowering it with specialized functionalities and resources to perform specific tasks, process data, make informed decisions, and enhance its overall capabilities in the defined domain.

Bad Data

The cloud fulfilled the promise of not requiring data to be deleted, but just keeping data stored. With this, came the pressure to quickly create documentation for users. This created a "data dump", where old data lives with new data, that old specifications that were never implemented are still alive, or even descriptions of functionalities of systems that have been outdated, but never updated in the documentation. Finally, documents seem to have forgotten what a "topic sentence" is, namely a sentence that expresses the main idea of the paragraph in which it occurs. Specifically, if we feed paragraphs into LLMs, we would like to extract the topic sentence.

LLM-based systems expect documentation to have well written pieces of text. Of note, OpenAI has stated that it is "impossible" to train AI without using copyrighted works.

This alludes not only to the fact that we need a tremendous amount of text to train these models, but also that good quality text is required.

RAG

This becomes even more important if you use RAG-based technologies (see Lewis, Patrick, et al. "Retrieval-augmented generation for knowledge-intensive NLP tasks." Advances in Neural Information Processing Systems 33 (2020): 9459-9474, the contents of which are incorporated by reference in their entirety). In RAG, we index document chunks using embedding technologies in vector databases, and whenever a user asks a question, we return the top ranking documents to a generator LLM that in turn composes the answer. Needless to say, RAG technology requires well written indexed text to generate the answers.

RAG provides a pipeline which enables the combination of documents and algorithms in tools. In RAG, we index document chunks using embedding technologies in vector databases, and, whenever a user asks a question, we return the top ranking documents to a generator LLM that in turn composes the answer. Thus, RAG is the process of optimizing the output of an LLM, so it references an authoritative knowledge base outside of its training data sources before generating a response.

Unified AI Agent Architecture for Cloud Services

Examples of cloud services include Zscaler Internet Access (ZIA), Zscaler Private Access (ZPA), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide cloud-based cybersecurity, namely Security-as-a-service through the cloud, including access control, policy enforcement, threat prevention, data protection, and the like. ZPA can include access control, segmentation, Zero Trust Network Access (ZTNA), etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs). Those of ordinary skill in the art will recognize various other types of cloud services are also contemplated.

The present disclosure addresses the application of using AI agents with cloud services, such as a copilot which is an AI assistant that allows a user to interact with the cloud service for a variety of tasks.

FIG. 6 is a logical diagram of an AI platform 500 that can provide AI functionality with one or more cloud services. The AI platform 500 can support multiple cloud services, such as for copilot functionality. The AI platform 500 is depicted in a logical manner in FIG. 6 and includes data sources 502, raw and transformed data 504, AI/ML tools 506, a modeling layer 508, and an application layer 510. The AI platform 500 can be realized as one or more AI agents 400, e.g., the application layer 510 can support the user request 410, the modeling layer 508 can be the agent core 402, the AI/ML tools 506 can be the tool 408, etc. The data sources 502 can include various data based on operations of the cloud services, product data, enterprise application data, third party data, web logs, other logs, and the like. The raw and transformed data 504 can include modified versions of the data in the data sources 502.

The AI platform 500, in an embodiment, can focus on providing model-based insights which help in understanding various aspects of business, customers, and products. In an embodiment, the AI platform 500 can provide generative AI Platform-as-a-Service. To start, various LLMs were used for providing functions related to cloud services. From this experience, it was determined that LLMs by themselves are not able to do much (in the sense that it hallucinates a lot), unless you fine tune it with your own data, fine tune it with instructions following capabilities (algorithms), connect to document sources to avoid hallucinations, or connect to data sources to enable better data analysis. That is, there is a need for AI agents 400, not merely LLMs.

The AI platform 500 is a unified foundation model for AI agents 400. The idea is that given a foundation model for an AI Agent, where any group willing to develop a new LLM project would only need to connect to it, and implement data connectors, documents, algorithms, and possibly fine tuning it.

AI Platform as a Copilot for User Experience Monitoring

For illustration purposes, the AI agents 400 and the AI platform 500 are described with reference to a user experience monitoring service, such as ZDX available from Zscaler. In the traditional computing model, most users were centrally located under the control and monitoring of IT in an organization. The transformation of hybrid work, cloud, and zero trust has upended this approach. IT is no longer in control and the lack of visibility creates complexity in resolving issues. As such, there are Digital Experience Monitoring (DEM) services which provide visibility across devices, networks, and applications, even outside of IT control, for the detection and resolution of issues and their root causes.

Also, an AI copilot is a tool that can assist a user with a service. It is more helpful than a help guide in that it seeks to support a user in tasks and decision making, such as for context-aware assistance, automation of tasks, data analysis, communication, and the like. Importantly, an objective of a copilot is to reduce the requirement for user expertise. For example, in DEM, the AI copilot could provide answers as well as automate solutions, such as, "my Internet is slow, what should I do?" Those skilled in the art will appreciate the present disclosure contemplates the AI agents 400, the AI platform and the AI copilot in various use cases, i.e., DEM is shown for illustration purpose; other uses are contemplated.

Figure 7:
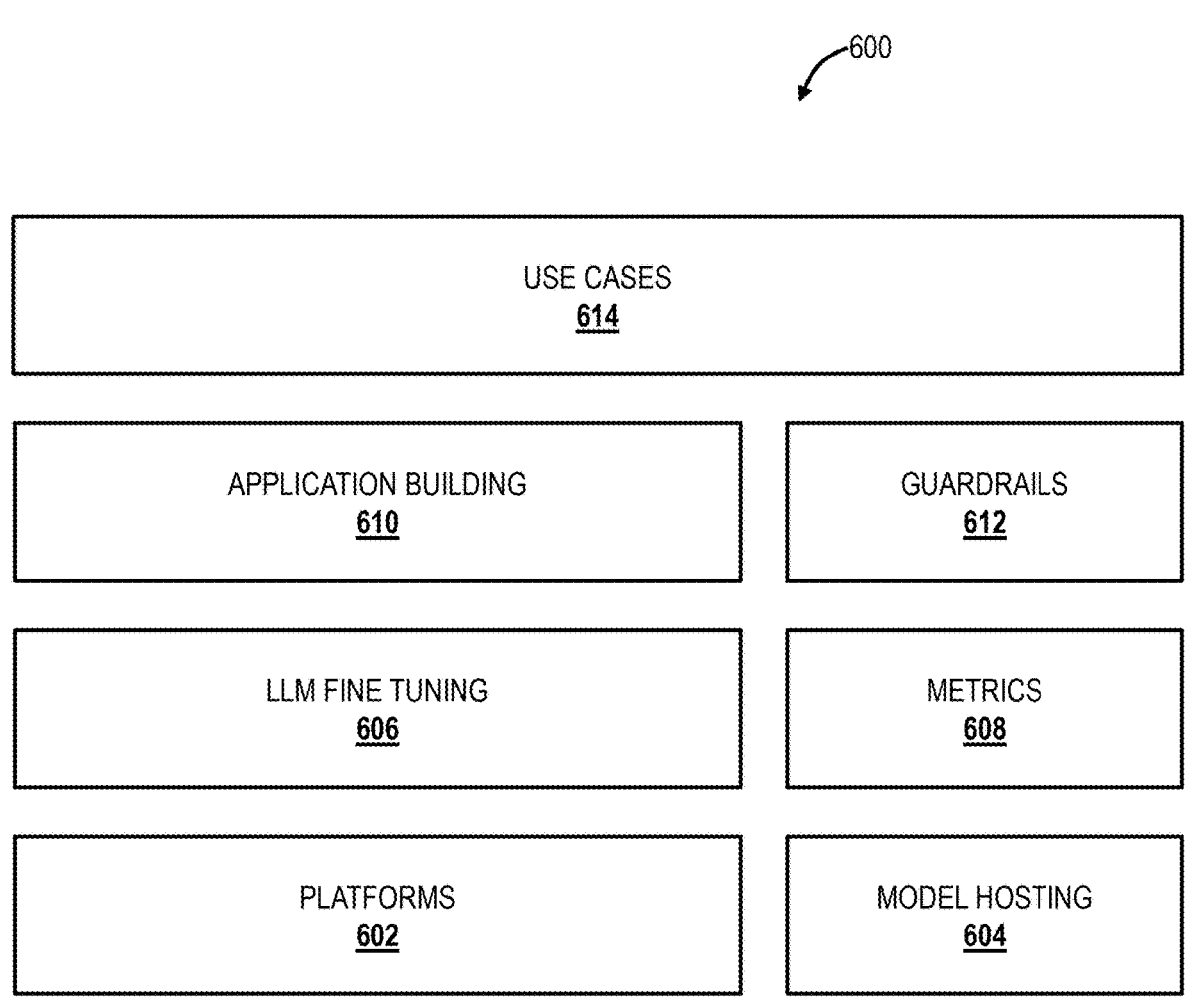
FIG. 7 is a logical diagram of an example AI copilot system, which utilizes the AI agents of FIG. 5 and the AI platform of FIG. 6.

FIG. 7 is a logical diagram of an example AI copilot system 600, which utilizes the AI agents 400 and the AI platform 500. Those skilled in the art will appreciate FIGS. 5-7 are logical diagrams describing functionality. Of course, in implementation and realization, the functionality can be split up, combined, etc. with these FIGS. 5-7 presented as examples. The AI copilot system 600 includes a platform layer 602, a model hosting layer 604, an LLM fine tuning layer 606, metrics 608, an application building layer 610, guardrails 612, and various use cases 614 being serviced.

The platform layer 602 generally includes the compute resources and associated tools, hosting, etc., including commercial offerings as well as in-house developed environments. The model hosting layer 604 provides a servicing functionality to connect, launch, and generally service the models. The LLM fine tuning layer 606 includes LLMs, a fine tuners, training tools and data sets, and the like. The metrics 608 can include various measurement techniques to determine model effectiveness, from the LLM fine tuning layer 606, such as language metrics, ML metrics, alignment metrics, production metrics, etc. The application building layer 610 can include an orchestrator that manages different tools to build applications between the user cases 614 and the models being hosted below. The guardrails 612 ensure valid structure, safety, style, etc. Finally, the use cases 614 can be practically anything, such as assisting in DEM and the like.

Figure 8:
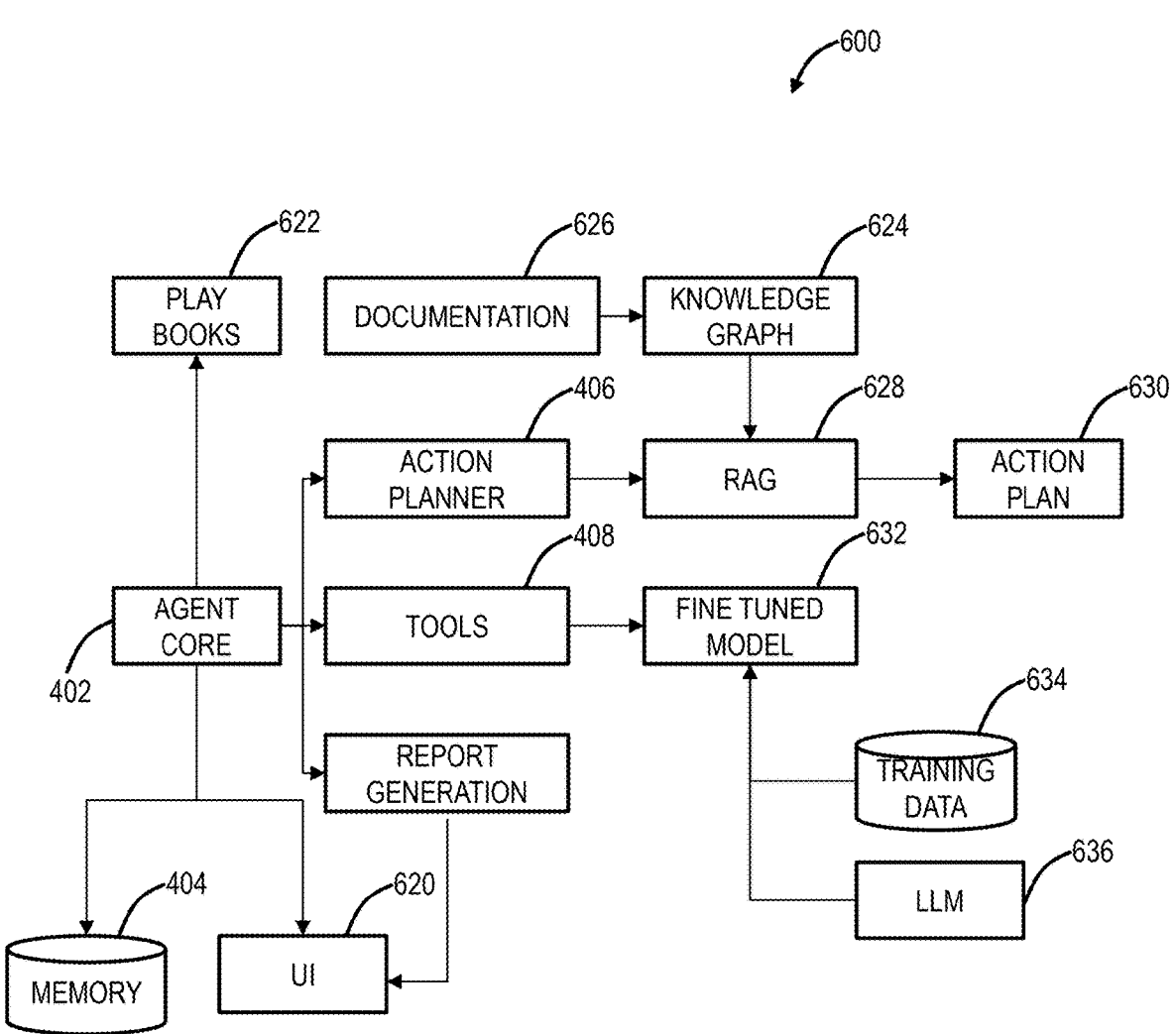
FIG. 8 is a flow diagram of functionality in the AI copilot system of FIG. 7, in the example use case of user monitoring.

FIG. 8 is a flow diagram of functionality in the AI copilot system 600, in the example use case of user monitoring. FIG. 7 can be seen as a static view of the AI copilot system 600, where FIG. 8 presents a dynamic view, in the example use case of user monitoring. Do note, the AI copilot system 600 expands on the AI agents 400 and the AI platform 500, and includes the agent core 402, the memory 404, the planner 406, and the tools 408. Further, the AI copilot system 600 includes a user interface (UI) 620, playbooks 622, a knowledge graph 624 created from data such as documentation 626, a RAG 628 that develops an action plan 630 from the knowledge graph 624 and the planner 406, etc. The tools 408 include a fine tuning 632 component that can use training data 634 and other LLMs 636.

For the playbooks 622, sometimes, experts have already captured important complex scenarios that need to be executed. Because these playbooks involve complex scenarios that are extremely important to customers (user), we do not want to leave it to the planner to figure out how to execute this task, as we have seen that the accuracy of the planner can degrade exponentially as the number of sub-tasks increases.

For the graphs 624, words are connected to concepts, and, in an example user case of networking, cybersecurity is inferred from a network topology. So, it is important to increase accuracy of results by using concept and network topology graphs in order to better provide context to the planner so that it can perform good planning.

For the guardrails 612, recently a few papers showed that LLMs can leak out training data by asking questions in different ways (in fact, sometimes even simple questions can leak out training data). For example, we were able to get an example model to leak out training data by simply asking: Generate 100 questions similar to "I want to order a Margherita gourmet pizza in 20 minutes." In addition to that, you want to avoid questions that are not relevant to the domain, bias, racism, and the like. In FIG. 8, the UI 620 can provide an interface for the user to interact, e.g., enter a query, etc., receive a report, action plan, etc.

Example Operation

Assume a user uses the AI copilot system 600 for the following questions: What happens if I add policy a to my configuration? The following steps can be implemented by the AI copilot system 600:

1. A=retrieve current configuration
2. B=simulate configuration(A)
3. A'=add_policy_to_configuration(A, a)
4. B'=simulate configuration(A')
5. C=compare(B, B')
6. Report visualization of results(C)

LLM is the New UI/UX

The acceleration of LLM model development and their visibility have prompted the genesis of many LLM-based products. Recently, the release of ChatGPT was a milestone that signaled a significant shift in society, including changes in software design paradigms. Initially, LLMs like ChatGPT revolutionized the field with advanced chatbots and AI Agents, enhancing the ability of these models by connecting data sources, algorithms and visualizations to LLMs.

However, there has been a transition towards more sophisticated systems such as Retrieval-Augmented Generation (RAG) and AI Agents. Although more recent LLMs have the capability to do data analysis and even data summarization and representation, the ability to connect to external data sources, algorithms and specialized interfaces to LLMs adds additional flexibility to LLMs by enabling it to perform tasks that involves analysis of domain specific real time data, or even the possibility to perform tasks that are still beyond LLM's capabilities.

Here, there is a discussion of the changes in software design using AI Agents, specifically, the shift from traditional UI/UX user stories in software design to LLM-based AI Agent interfaces implementing several user stories using a single natural language interface. This transition represents a paradigm shift from well-structured documentation of data sources, UI/UX interactions, and algorithms, where you can reasonably well estimate size and effort of development, to a more flexible, albeit imprecise, mode of interaction through natural language descriptions. While this shift has unlocked unprecedented levels of user accessibility and software adaptability, it has also introduced unique challenges. One of the most fundamental questions addressed herein is on how to estimate the development effort and size of these new systems, where the LLM interacts with the user sometimes in unknown ways.

Next Generation AI Agent System

FIG. 9 is a flowchart of an AI agent process 650. The AI agent process 650 contemplates implementation as a method having steps, via a processing device configured to implement the steps, and as a non-transitory computer-readable medium storing instructions that, when executed, cause one or more processors to implement the steps.

The AI agent process 650 includes operating an Artificial Intelligence (AI) agent system that includes an agent core connected to memory, one or more tools, and a planner (step 652); receiving a request from a user (step 654); utilizing the planner to break the request down into a plurality of sub-parts that are each individually simpler than the request (step 656); and generating an answer to the request using the plurality of sub-parts with the memory and the one or more tools (step 658).

The agent core can be a first Large Language Model (LLM) and the planner is a second LLM, different from the first LLM. The memory can include a history memory and a context memory, with the history memory storing a record of previous inputs, outputs, and outcomes of actions taken by the AI agent, and the context memory includes relevant information about a current state. The one or more tools can be configured to perform specific functions based on a defined domain of the AI agent.

The one or more tools can include Retrieval-Augmented Generation (RAG). The RAG can include a plurality of questions and corresponding answers and a plurality of descriptions and corresponding algorithms, where a given answer is provide based on an associated questions and a given algorithm is performed based on an associated description. The agent core can be further configured to implement a given algorithm based on the answer matching the associated description.

The one or more tools can include one or more of a database connection, Natural Language Processing libraries, visualization tools, simulation environments, and monitoring frameworks. The planner can be configured to generate a plurality of related questions based on the request; and determine a plurality of algorithms, data sources, and user interface aspects, based on the plurality of related questions, and provide the plurality of algorithms, the data sources, and the user interface aspects to the agent core for orchestrating the answer. The AI agent system can operate as an assistant to one or more cloud services.

Further, the AI agent system can be adapted to help users troubleshoot issues relating to their devices. in various embodiments, the present methods include an AI agent that, upon authentication of a user, can help resolve device or network issues based on device and user specific data collected by the cloud based system described herein.

In another embodiment, a cloud system can be configured to implement the various functions described herein. Those skilled in the art will recognize a cloud service ultimately runs on one or more physical processing devices such as servers and computing devices, virtual machines, etc. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software-as-a-Service" (SaaS) is sometimes used to describe application programs offered through cloud computing. A common shorthand for a provided cloud computing service (or even an aggregation of all existing cloud services) is "the cloud."

Digital Experience Monitoring

Again, the cloud 120 provides security as a service as well as Zero Trust Network Access (ZTNA), and can also be used to provide real-time, continuous digital experience monitoring, as opposed to conventional approaches (synthetic probes). A key aspect of the architecture of the cloud 120 is the inline monitoring. This means data is accessible in real-time for individual users from end-to-end. As described herein, digital experience monitoring can include monitoring, analyzing, and improving the digital user experience.

The cloud 120 connects users 102 to applications, the Internet, the cloud services, etc. The inline, end-to-end visibility of all users enables digital experience monitoring. The cloud 120 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud 120 provides a unique architecture that can enable digital experience monitoring, network application monitoring, infrastructure component interactions, etc. Of note, these various monitoring aspects require no additional components—the cloud 120 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud 120 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud 120 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud 120 can operate at 10 gigabits (10G) Ethernet and higher at full line rate and support a rate of 100,000 or more flows per second or higher.

Applications can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 110 or the cloud edge to quantify user experience for specific applications, i.e., the application-related and device-related data. The cloud 120 can further collect the network-related and the protocol-related data (e.g., Domain Name System (DNS) response time).

| Application-related data | |
| --- | --- |
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

| Network-related data | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

| Device-related data (endpoint-related data) | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud 120 can generate service health as a combination of CPU, memory, and the load time of the service while processing a user's request. The network health could be based on the number of network path(s), latency, packet loss, etc.

Lightweight connectors can also generate similar metrics for the applications. In an embodiment, the metrics can be collected while a user is accessing specific applications that user experience is desired for monitoring. In another embodiment, the metrics can be enriched by triggering synthetic measurements in the context of an inline transaction by the application 110 or cloud edge. The metrics can be tagged with metadata (user, time, app, etc.) and sent to a logging and analytics service for aggregation, analysis, and reporting. Further, network administrators can get UEX reports from the cloud 120. Due to the inline nature and the fact the cloud 120 is an overlay (in-between users and services/applications), the cloud 120 enables the ability to capture user experience metric data continuously and to log such data historically. As such, a network administrator can have a long-term detailed view of the network and associated user experience.

Context Aware AI Agent

The present disclosure seeks to equip IT administrators with a seamless and efficient way to diagnose and resolve IT and network-related issues, ensuring an optimal user experience for employees within their organizations. With a growing reliance on cloud and network services, maintaining system performance and addressing potential disruptions is critical to business operations. Currently, the cloud 120, also referred to as "Zscaler" (the assignee and applicant of the present application) processes an astounding 300 billion data points daily, collected from over 40 million users worldwide. As the volume of data continues to expand, IT teams face increasing challenges in leveraging traditional User Interfaces (UIs) and dashboards to effectively troubleshoot issues. Administrators are often forced to sift through dozens, if not hundreds, of individual web pages and dashboard views to identify the root cause of problems, significantly slowing down response times.

To tackle this, the present disclosure provides systems and methods for simplifying the troubleshooting process by offering more advanced tools that streamline data analysis and allow IT professionals to quickly identify and resolve issues. By minimizing the complexity of data navigation and enhancing user-friendliness, the present systems and methods aim to help organizations maintain seamless digital experiences for their employees, even as their digital ecosystems become more complex.

Troubleshooting IT and networking issues is a mission-critical, time-sensitive task that directly affects the continuity and efficiency of business operations. Any delays or inaccuracies in identifying and resolving these issues can lead to significant disruptions, impacting productivity and revenue. Historically, organizations have relied on traditional experience monitoring tools to detect and address such problems. While these tools have been valuable for providing basic insights, they often fall short when it comes to diagnosing more complex IT and network-related challenges.

Traditional tools are typically designed to monitor surface-level metrics and performance indicators. However, as digital environments grow more intricate, with interconnected cloud services, remote workforces, and a vast number of devices and applications, these tools struggle to provide the depth and granularity needed to accurately pinpoint the root causes of issues. The lack of advanced diagnostic capabilities can lead to prolonged troubleshooting processes, incomplete resolutions, and recurring problems.

As organizations face increasingly sophisticated IT infrastructures, there is a growing demand for more intelligent and automated solutions that go beyond surface-level monitoring. These solutions need to offer real-time insights, predictive analytics, and deeper visibility into the entire digital ecosystem to enable IT teams to diagnose and resolve complex issues swiftly and effectively.

One of the major challenges with traditional experience monitoring tools is their inherently limited scope and narrow focus. These tools are often designed to provide insights into specific components or isolated layers of the IT infrastructure, such as network performance, server health, or application uptime. While this data can be helpful, it often fails to deliver a comprehensive view of the entire IT environment. This fragmented perspective makes it difficult to diagnose issues that involve multiple layers or cross several components, leading to inefficient and prolonged troubleshooting processes. For example, a problem affecting user experience might stem from a combination of network latency, application performance, and device configurations, all interacting in complex ways. Traditional monitoring tools, by focusing on individual layers like the network or application alone, can miss these interconnected factors. Without visibility into how these layers interact, IT teams may spend valuable time chasing symptoms in one part of the system without ever identifying the true root cause of the issue.

This lack of holistic insight not only slows down resolution times but can also result in misdiagnoses, temporary fixes, or unresolved recurring problems. To overcome these limitations, there is a growing need for experience monitoring solutions that provide end-to-end visibility across the entire digital infrastructure. Such tools must offer a comprehensive view of how various components and layers interact, enabling IT teams to accurately diagnose issues that span across different areas of the infrastructure, thereby streamlining the troubleshooting process and minimizing downtime.

Furthermore, traditional experience monitoring tools often require Subject Matter Experts (SMEs) to manually analyze large volumes of data, logs, and reports, which is both time-consuming and prone to error. This approach increases the Mean Time to Resolve (MTTR) and can lead to misdiagnosis, as SMEs may struggle to identify the root cause amidst the complexity of modern IT environments. The reliance on manual analysis slows down troubleshooting and increases the risk of addressing symptoms rather than underlying issues. To improve efficiency, modern solutions must incorporate automated analysis and AI to reduce MTTR and ensure more accurate diagnoses.

By utilizing the present AI agent powered methods described herein, users will be able to converse with the system and get to the resolutions much quicker and efficiently while troubleshooting IT/Networking related issues.

As described herein, LLMs are a breakthrough technology in the field of artificial intelligence that excel in understanding and generating human language. These models are trained on vast amounts of text data, enabling them to capture the complexities of language and learn patterns, grammar, and contextual relationships. This technology has the potential to revolutionize various industries, from customer service and content generation to research and innovation, by providing powerful tools for automated language processing and generation. These LLMs can power domain-specific AI assistants that assist humans in various tedious tasks including parts of the troubleshooting workflows such as manual analysis of large amounts of data, logs, reports etc. The goal is to help IT administrators interpret large volume of telemetry data collected by the cloud 120 to identify the reasons behind a user's poor performance. The LLM model uses inputs such as web probes, MTR, device events, and other time-series metrics like process stats to guide the analysis. For example, The IT administrator can initiate a conversation with, "Can you please analyze this data and find the root cause for the bad experience score?" The AI agent then collaboratively examines the data from various angles, tailoring the analysis based on the administrator's expertise.

The present AI agent includes various key features in order to function as described herein. These features include contextual natural language interactions, interactions that are tailored to technical expertise, flexible UIs, smart suggestions, built-in data visualizations, and access to conversational history.

The present AI agent possesses advanced natural language understanding capabilities in order to effectively comprehend and interpret user queries and problem descriptions. By doing so, the AI agent can enable seamless communication and interactions between IT administrators and the AI agent. Different inputs are incorporated by the AI agent such as telemetry data sources, UI states/interactions, historical conversations, and domain-specific knowledge to compose highly contextual responses. Conversational data retrieval allows IT admins to query data using natural language, delivering swift and relevant insights and visualizations that aid in troubleshooting issues.

Figure 10:
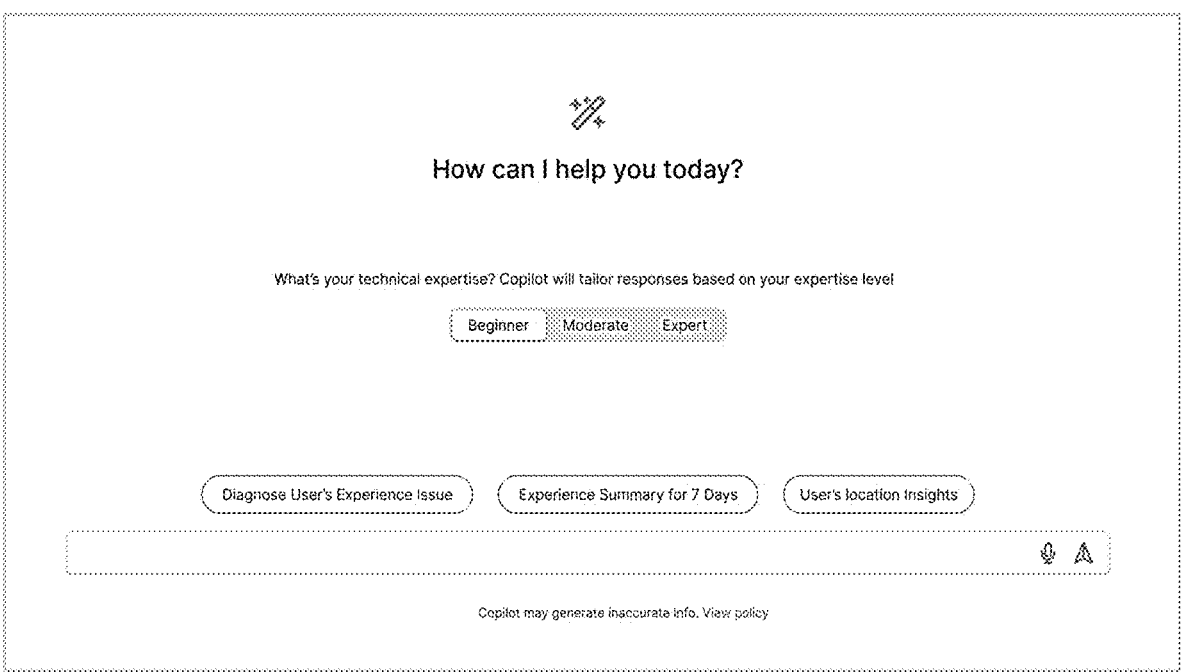
FIG. 10 is a screenshot of an AI agent landing page that is adapted to collect an expertise level of a user.

As stated, the AI agent can perform the analyzing and provide responses based on the technical expertise of the administrator that is invoking the conversation. That is, the conversation can be dynamic, adapting to the administrator's expertise level. The AI agent processes the data and discusses potential root causes with the IT administrator. It engages collaboratively with IT administrators of varying levels of expertise to provide tailored analysis and explanations as a companion subject matter expert. FIG. 10 is a screenshot of an AI agent landing page that is adapted to collect an expertise level of a user. That is, prior to initiating a conversation with the AI agent, the present systems and methods can include determining the expertise level of the user before the conversation, i.e., via the UI shown in FIG. 10.

Figure 11:
FIG. 11 is a screenshot of an example conversation with an AI agent.

The UI for the AI agent offers IT administrators flexibility to switch seamlessly between different sections/views while retaining context from the conversations and adapting to the new states. Further, the UI provides smart suggestions to the IT administrators for next logical/contextual follow up questions or queries based on multiple parameters. This helps reduce the cognitive load needed to write follow up queries from scratch and guide the analysis efficiently to speed up the process of getting to root causes. FIG. 11 is a screenshot of an example conversation with the AI agent. In this example, it can be seen that the AI agent is adapted to provide graphical visualizations based on the administrator/user's queries. Further, based on the context of the conversation, the AI assistant is further adapted to provide smart suggestions 702 for next logical/contextual follow up questions.

Figure 12:
FIG. 12 is a screenshot of the AI assistant providing responses which include data visualizations.

As shown and described, the AI assistant is adapted to produce a variety of data visualizations to illustrate and supplement the text-based insights. FIG. 12 is a screenshot of the AI assistant providing responses which include data visualizations.

As described herein, the present systems and methods leverage advanced AI/ML and LLMs to transform telemetry data of the cloud 120 into intuitive natural language insights. Such methods enable real-time troubleshooting through an intelligent AI agent. Various embodiments include providing, through the AI agent, real-time telemetry data analysis by collecting and analyzing real-time telemetry data from a plurality of sources including network performance metrics, web probes, device logs, process statistics, and error reports. Further, by providing follow-up question recommendations, the analysis can be refined based on the context of the conversation.

The following includes a plurality of example conversations with the present AI agent highlighting its real-time telemetry data utilization.

Scenario 1

An IT administrator asks: "Why is user John Doe experiencing poor network performance?"

AI agent analyzes web probes, device logs, and network traffic metrics and responds: "John Doe's device is experiencing high packet loss (12%) due to network congestion on his local gateway. Additionally, his Wi-Fi signal strength is weak (−80 dBm), which may be contributing to the issue."

Follow-up suggestion: "Would you like to see a comparison of network performance metrics over the past 24 hours to identify any patterns?"

Scenario 2

An IT administrator asks: "Are there any recent changes that could have affected the network performance?"

The AI agent cross-references recent configuration changes, software updates, and network policies and responds: "A new security patch was deployed to John Doe's device two hours ago, which coincides with the start of the network performance issues. The patch includes an updated firewall configuration that may be impacting network throughput."

Follow-up suggestion: "Do you want to review the firewall settings or roll back the recent update to see if performance improves?"

Further, as described, the AI agent integrates telemetry data collection to provide precise, contextually aware troubleshooting guidance. This includes dynamic data correlation to correlate telemetry data, historical system logs, and user behavior to offer targeted insights for IT issues that involve multiple layers (network, device, application). The AI agent can further maintain historical conversation context, previous queries, and resolutions to refine future responses.

The following includes a plurality of example conversations with the present AI agent highlighting its contextual awareness.

Scenario 1

An IT administrator asks: "Why are multiple users in Location X reporting slow application response times?"

The AI agent analyzes application performance data, local network logs, and device logs for users in Location X and responds: "The issue is caused by high latency on the link between Location X and the central data center. Network bandwidth has dropped by 25% due to increased traffic from a scheduled data backup that started an hour ago."

Follow-up suggestion: "Would you like to reschedule the data backup to off-peak hours to alleviate network congestion?"

Scenario 2

The administrator asks: "Can you provide a root cause analysis for the intermittent connection drops over the past week?"

The AI agent gathers and evaluates historical data and responds: "Intermittent connection drops were caused by fluctuating ISP performance in Location Y between 2:00 AM and 5:00 AM over the past five days. There was also a misconfiguration in the network routing that caused failovers."

Follow-up suggestion: "Do you want to initiate a diagnostic test on the routing or contact the ISP for further investigation?"

Moreover, the AI agent is further adapted to tailor responses based on the expertise level of the IT administrator, adapting explanations and solutions accordingly while providing actionable next steps based on the situation via smart recommendations.

The following includes a plurality of example conversations with the present AI agent highlighting its ability to provide responses based on an expertise level of the user facilitating the conversation.

Scenario 1

A novice IT administrator (Junior Administrator) asks: "Why is the application slow on the user's device?"

The AI agent analyzes device performance metrics and responds: "The user's device has low available memory (5%) and high CPU usage (85%), which could be slowing down the application. Several background applications are consuming resources."

Smart recommendation: "Would you like to remotely close unnecessary applications or schedule a device restart to free up resources?"

Scenario 2

An experienced administrator (Senior Administrator) asks: "What are the network and device-level metrics impacting user experience in the past 48 hours?"

The AI agent provides detailed technical analysis and responds: "Device CPU spiked to 95% intermittently due to a background process (Process X) consuming excessive resources. Network latency to the corporate server averaged 300 ms, which is above the acceptable threshold of 150 ms. Packet loss increased to 8% during peak hours."

Smart recommendation: "Consider terminating Process X or investigating its resource usage patterns. Additionally, reviewing network policies or QoS settings may help reduce latency."

Scenario 3

The administrator queries: "What are the possible next steps to improve the user's performance?"

AI agent analyzes potential solutions and responds: "You could restart the network service to clear possible congestion, update the user's device firmware (currently two versions behind), or adjust the application's settings to reduce resource consumption."

Smart recommendation: "Would you like to initiate a firmware update or modify application settings remotely?"

Context Aware AI Agent Process

Figure 13:
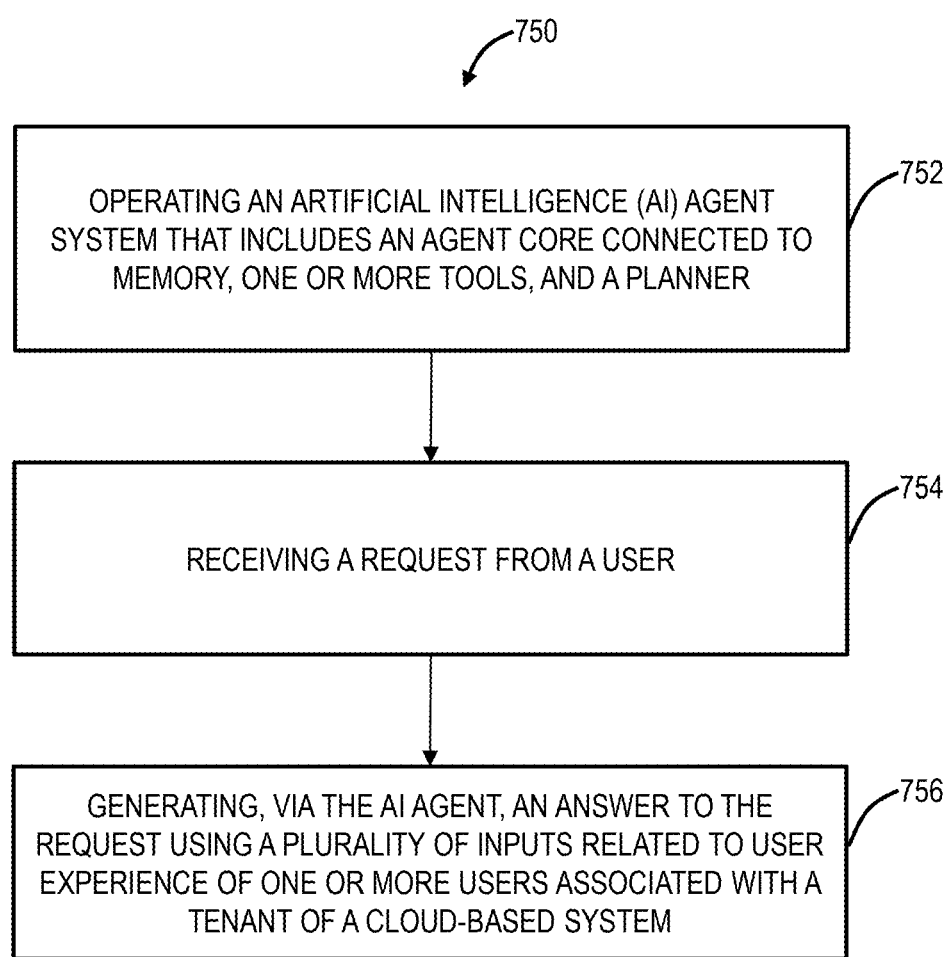
FIG. 13 is a flowchart of a process for a context aware AI agent.

FIG. 13 is a flowchart of a process 750 for a context aware AI agent. In various embodiments, the process 750 is contemplated as a method having steps, a processing device configured to implement the steps, a cloud-based system configured to implement the steps, and as a non-transitory computer-readable medium storing instructions for programming one or more processors to execute the steps. The process 750 includes operating an Artificial Intelligence (AI) agent system that includes an agent core connected to memory, one or more tools, and a planner (step 752); receiving a request from a user (step 754); and generating, via the AI agent, an answer to the request using a plurality of inputs related to user experience of one or more users associated with a tenant of a cloud-based system (step 756).

The process 750 can further include wherein the plurality of inputs includes telemetry data sources, User Interface (UI) states/interactions, historic conversations, and domain-specific knowledge. The steps can further include prior to receiving the request, receiving an expertise level of the user; and generating the answer to the request based on the expertise level of the user. The steps can further include providing a User Interface (UI) for the user to input the expertise level. The steps can further include generating and providing to the user one or more suggestions for follow-up requests. The one or more suggestions can be based on a conversation history between the AI agent and the user. Generating the answer can include generating one or more interactive data visualizations based on the request.

Generative UI for AI Agent Experience

The present sections present systems and methods for providing a generative UI within AI agent experiences. It is envisioned that all interactions with UIs within the products (ZPA, ZIA, ZXD, etc.) described herein will include utilization of AI agents. That is, it has been studied that customers wish to interact with the products via AI agents instead of directly through the UI. Based thereon, the present systems and methods include generating UIs based on questions from users through the AI agent.

Again, the present disclosure provides an LLM-powered conversational AI experience for digital experience tools.

This AI/ML agent includes domain knowledge, methodology of experts and best practices, understands the admin intent, understands the available tools, simplifies the thinking process, and remembers and recommends. The present systems and methods further provide a concept of "Generative UI" as a digital creator, utilizing the power of extensively trained in-house LLMs to produce contextual and visual responses that assist IT administrators to quickly conduct an in-depth analysis of large datasets or run a root cause analysis on a complex correlation to identify patterns and remediation steps.

That is, when an administrator wants to improve the digital experience for a specific user, the AI agent can be presented as the default interaction pattern to assist their open-ended, analytical thought process. Using natural language prompts or system generated smart suggestions as a user input, the AI agent generates either a text-based response or interactive data visualizations such as maps, tables, charts, graphs, etc. that may or may not exist in the existing product interface. To achieve this, the AI agent analyzes and emulates patterns, styles and structures inherent in its training data. more particularly, during training, the training data can include examples of prompts and responses, the responses including various forms of data visualizations. By doing this, the AI agent can learn which data visualizations can be used to display certain types of data, and which data visualizations are more desired.

This novel interaction behavior stands out for its ability to engage users in creative and collaborative processes, offering innovative contributions that extend beyond the scope of mere analytics with existing dashboards, filters and drilldowns. These conversational sessions with the AI agent then get stored automatically and can be retrieved and resumed as needed for further analysis continuation.

Figure 14:
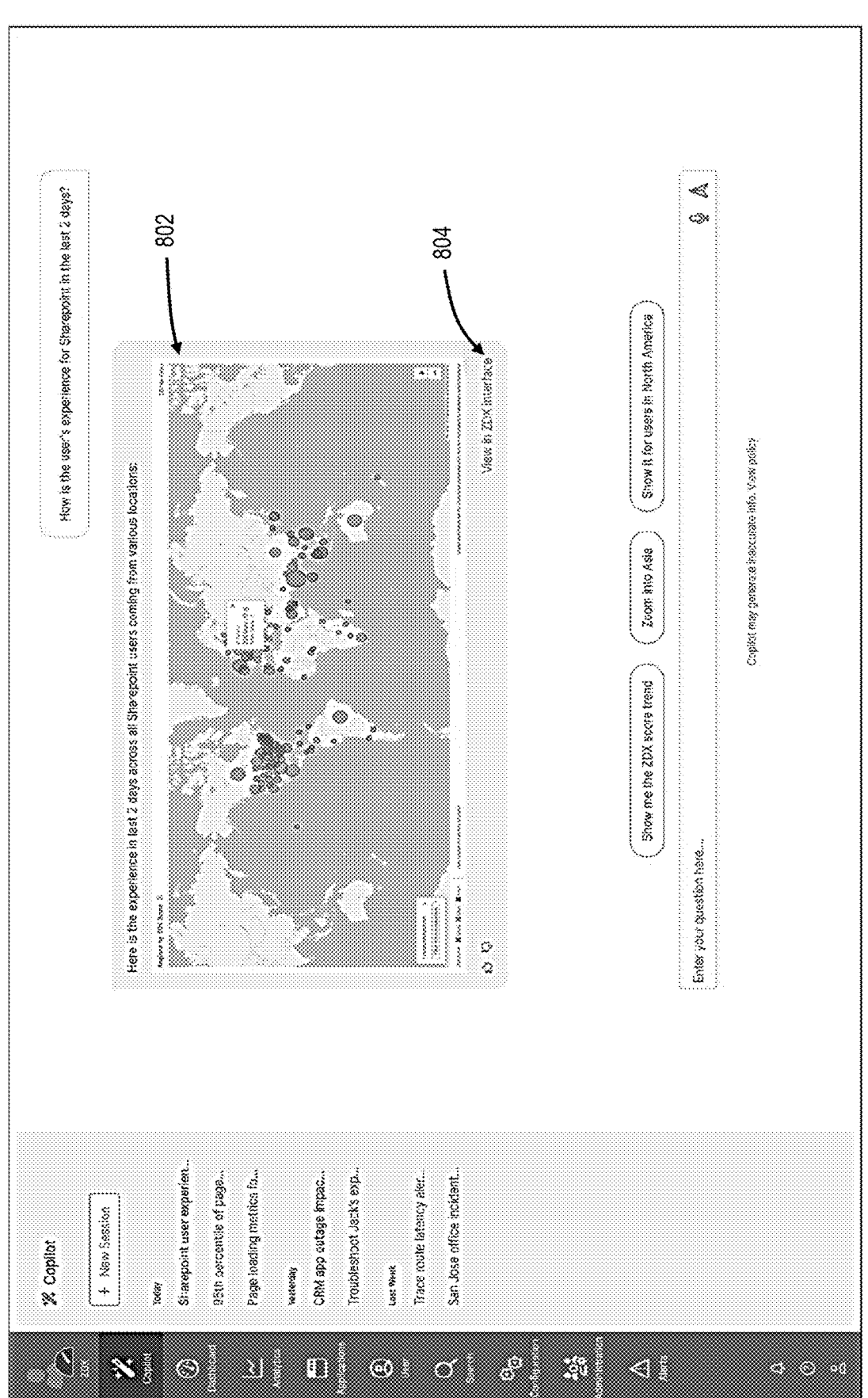
FIG. 14 is a screenshot of an example conversation with the AI agent including a generated interactive UI.
Figure 15:
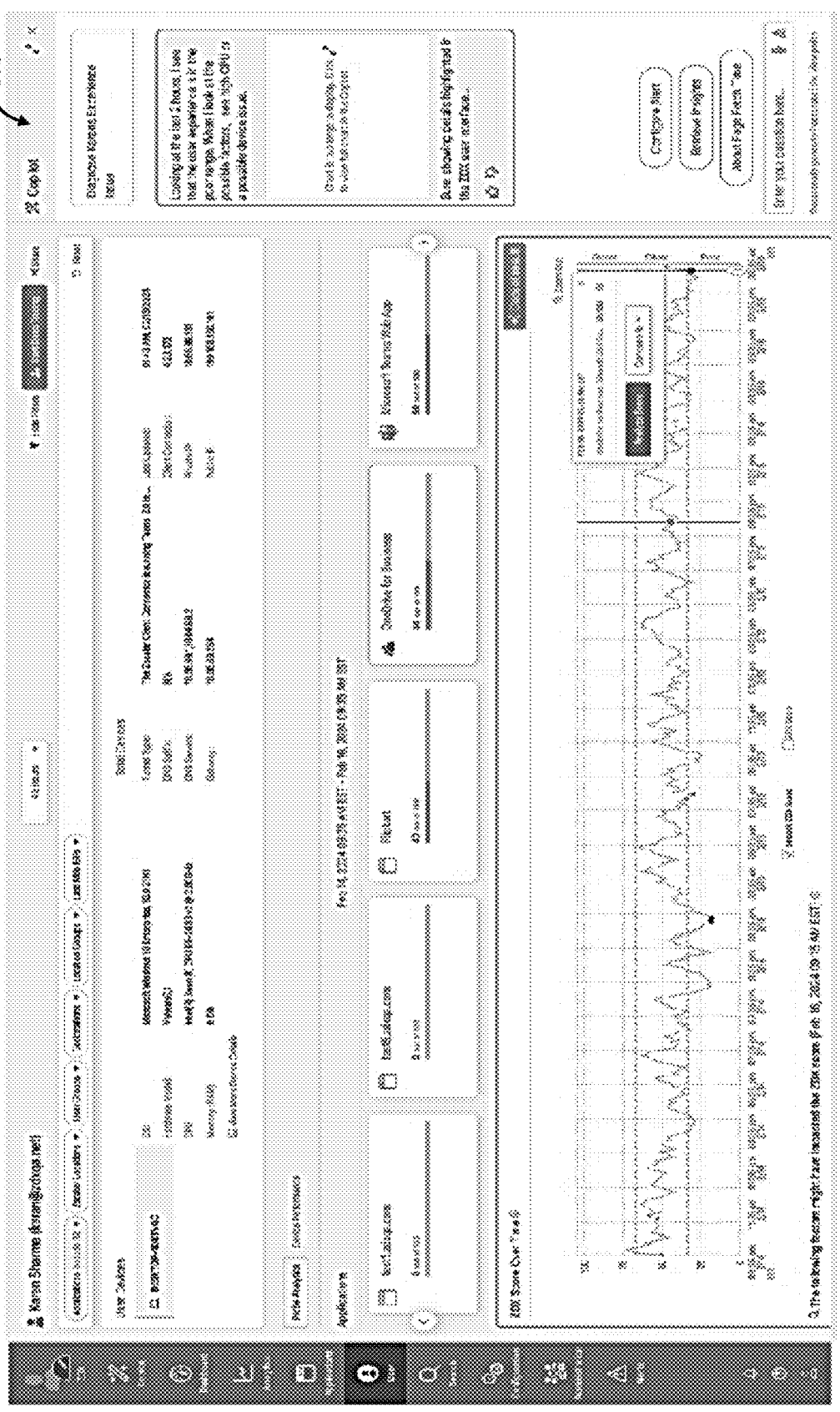
FIG. 15 is a screenshot of a UI that is navigated to after selecting a link.

FIG. 14 is a screenshot of an example conversation with the AI agent including a generated interactive UI. As can be seen, the AI agent provides the generated UI 802 in an interactive window within the conversation. This generated UI 802 can include the various interactive data visualizations. In various embodiments, this generated UI 802 is interactive, allowing users to interact with the generated UI 802. That is, users can select elements within the generated UI 802 as can be done with traditional UIs as described herein. Further, the AI agent is further adapted to generate and provide a link 804 to allow users to navigate to an associated page within the digital experience monitoring platform/program/dashboard (ZDX) described herein. That is, users that are used to the traditional workflow of the ZDX platform/UI (or any other cybersecurity platform) can click on "View in ZDX interface" (the link 804) to navigate to the widget that contains information in the AI agent generated UI 802 responses. FIG. 15 is a screenshot of a UI that is navigated to after selecting the link 804. This UI can include a window 806 that highlights the conversation with the AI agent and provides access thereto in order to allow the user to provide additional queries while viewing the page within the ZDX dashboard. Based thereon, the AI agent can allow user to navigate to various pages of various security services through the generated UIs while also displaying the current conversation with the AI agent.

Figure 16:
FIG. 16 is a screenshot of an AI agent providing an interactive UI response.

Besides the textual prompts and suggestions, the user input can also be taken using an interactive data visualization. For example, in FIG. 16, the AI agent generated response includes an interactive UI 802 as an interactive date picker to seamlessly configure the user input, which could be otherwise challenging to receive precisely in the expected format. In the example shown in FIG. 16, the user asks for help in diagnosing a user experience issue for a particular user. Based on this, the AI agent asks the user to select a data range via the interactive UI 802. Responsive to the user selecting the data range through the interactive UI 802, the AI agent can provide responses to the user query. This form of additional data gathering can be based on the AI agent determining that additional data is necessary for providing a useful response.

Based on the above described features, the preset disclosure provides a system that employs LLMs to generate contextual and visual responses such as graphs, charts, and other data visualizations in real-time, enhancing user interactions with complex data sets. The system interprets natural language prompts and decides the most appropriate visual representation based on patterns and styles learned from its training data. Based thereon, an example interaction with the Ai agent can include the following.

User query: "What is the trend of login failures across all regions in the last month?"

AI agent decision: Recognizes that a line chart showing login failures over time is suitable.

AI agent response: Generates an interactive line chart displaying login failures per day for the past month, with the ability to filter by region.

The present systems further provide an AI agent that is adapted to, upon receiving natural language prompts or system-generated suggestions, generate interactive data visualizations that may not pre-exist in the product interface. Methods include interpreting the user's intent, selecting the appropriate visualization type, and rendering the visualization with interactive elements. Based thereon, an example interaction with the Ai agent can include the following.

User query: "Compare the average response times of Application A and Application B for the European region."

AI agent decision: Determines that a comparative bar chart or side-by-side line charts would effectively display the requested information.

AI agent response: Presents the chosen visualization with interactive features, such as tooltips showing exact values and options to adjust the time frame.

The AI agent synthesizes new outputs including text-based responses and visual elements by analyzing and emulating patterns, styles, and structures inherent in its training data. This allows the system to produce novel and contextually appropriate responses that extend beyond static dashboards and predefined reports. Based thereon, an example interaction with the Ai agent can include the following.

User query: "Is there a correlation between network latency and user satisfaction scores?"

AI agent decision: Based on training data, recognizes that a scatter plot can illustrate correlations between two variables.

AI agent response: Generates a scatter plot with network latency on the x-axis and user satisfaction scores on the y-axis, includes a trend line, and provides an analysis stating, "There is a negative correlation between network latency and user satisfaction in the observed data."

The AI agent can further adapt the selection of visualizations based on the context of the conversation and the inferred intent of the user. It leverages historical interactions and domain knowledge to refine its responses and provide the most relevant and helpful visual aids. Based thereon, an example interaction with the Ai agent can include the following.

User query: "Show me any anomalies in server performance after the last update."

AI agent decision: Identifies that anomalies can be highlighted using a time-series chart with anomaly detection markers.

AI agent response: Generates a time-series chart of server performance metrics with anomalies highlighted, provides insights into the nature of the anomalies, and suggests possible causes related to the recent update.

Finally, the AI agent can accept user input not only through text but also via interactive elements within the generated visualizations. This includes selections made on charts, maps, sliders, and other UI elements that the system can interpret and incorporate into the ongoing analysis. Based thereon, an example interaction with the Ai agent can include the following.

AI agent response: Presents a world map highlighting network status across regions.

User interaction: Clicks on a specific region to drill down into local issues.

AI agent reaction: Updates the conversation context to focus on the selected region, provides detailed insights, and adjusts subsequent responses accordingly.

Generative UI Process for AI Agents

Figure 17:
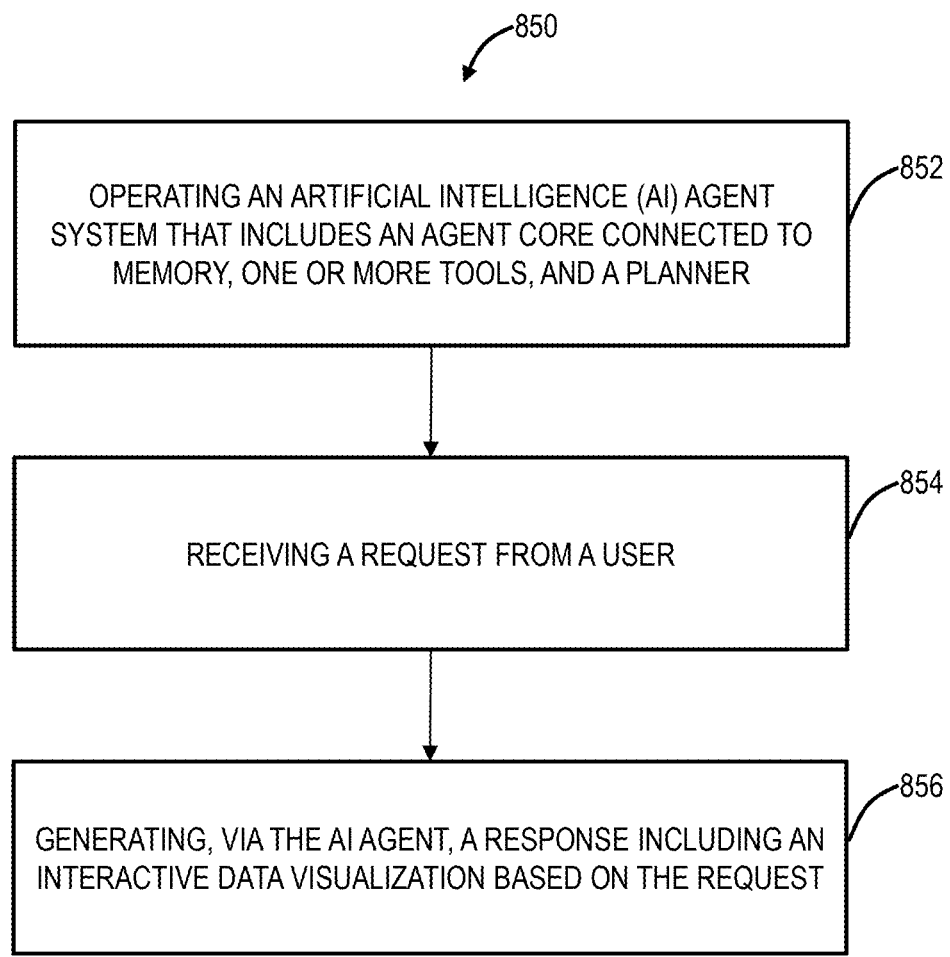
FIG. 17 is a flowchart of a process for generative UI for AI agents.

FIG. 17 is a flowchart of a process 850 for generative UI for AI agents. In various embodiments, the process 850 is contemplated as a method having steps, a processing device configured to implement the steps, a cloud-based system configured to implement the steps, and as a non-transitory computer-readable medium storing instructions for programming one or more processors to execute the steps. The process 850 includes operating an Artificial Intelligence (AI) agent system that includes an agent core connected to memory, one or more tools, and a planner (step 852); receiving a request from a user (step 854); and generating, via the AI agent, a response including an interactive data visualization based on the request (step 856).

The process 850 can further include wherein the interactive data visualizations include any of maps, tables, charts, and graphs. The interactive data visualizations can be interactive, allowing users to select elements within the interactive data visualizations. The generating can further include generating and providing a link to an associated page within a cybersecurity platform along with the interactive data visualization. Responsive to the user selecting the link, the steps can include navigating the user to the associated page within the cybersecurity platform. Responsive to navigating the user to the associated page within the cybersecurity platform, the steps can include providing a window within the page that highlights the conversation with the AI agent and provides access thereto to allow the user to provide additional requests while viewing the page. The steps can further include determining that additional information is required to generate a response; and generating and providing an interactive data visualization based thereon, the interactive data visualization allowing the user to input additional data required for generating the response.

AI Agent Input Using UIs

With AI agents, users can ask open-ended questions using a language-based interface or chat window, which is useful for exploring complex topics or receiving detailed insights. This intuitive approach allows IT administrators and users to interact more naturally, asking questions in a conversational manner to troubleshoot issues or gather information. However, this open-ended query system presents certain challenges, particularly in how users must provide input.

To get meaningful responses, users often have to type lengthy prompts or rely on other methods like copying and pasting detailed text. This can be cumbersome, especially in time-sensitive situations where quick answers are needed. The reliance on extensive, manually crafted inputs can slow down the interaction, reducing the overall efficiency that the AI agent is designed to improve. Moreover, crafting the right prompts can be a learning curve for users unfamiliar with the system, requiring them to formulate their questions precisely to obtain the most relevant or actionable insights.

To fully optimize the experience, different input methods need to be explored, such as natural language recognition that requires less precision, voice commands, or predictive text features that suggest query refinements, allowing users to interact more fluidly with the system and receive faster, more accurate responses.

Based thereon, the present systems and methods provide efficient methods to provide inputs to the AI agent, including allowing users to simply interact with elements within a UI to provide relevant prompts to the AI agent. Various examples include providing, via the AI agent, meaningful responses based on a user selecting data points within a data visualization in the UI, providing helpful information when a user hovers over or selects a button in the UI, and the like.

In order to provide meaningful responses based on user interactions with the UI, the AI agent again must leverage the various data sources. For example, if a user is presented with a line graph that has various spikes, the AI agent must understand the meaning behind the various spikes and be able to provide a description/explanation in response to the user selecting such a point in the graph. That is, if the user is presented with a line graph displaying CPU usage of a user, and the user selects a spike in the graph, the AI agent must be able to understand that the selected data point is s spike, and provide meaningful information such as why a spike in CPU usage occurred there, what could be don't to mitigate such spikes, etc.

Figure 18:
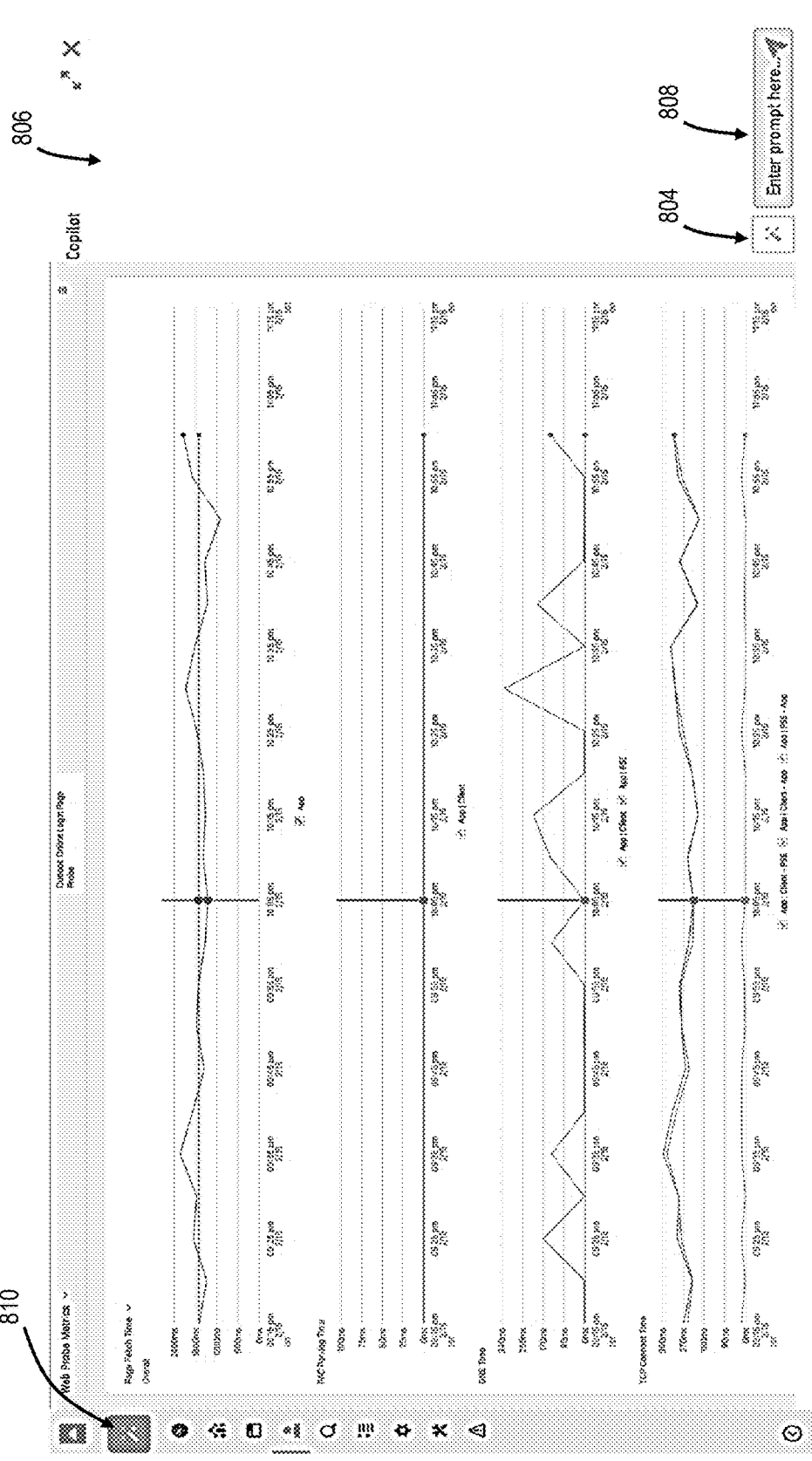
FIG. 18 is a screenshot of an example UI with the AI agent adapted to facilitate the UI-based inputs.

FIG. 18 is a screenshot of an example UI with the AI agent adapted to facilitate the UI-based inputs. This feature can be activated by selecting a wand icon 804, where after selecting the wand icon 804, the user can select portions of the UI, and the AI agent is adapted to provide responses based thereon. The input to the AI agent can be based on the user highlighting a section of the UI, i.e., via click and drag section selection, based on selecting a specific point or element of a graph within the UI, etc. This allows the user and the AI agent to focus on specific parts of displayed data in order to drill down specific questions. That is, based on the selections made within the UI, the AI agent can tailor its responses based on the selections and provide responses based on the selections.

The UI can allow users to highlight specific portions of the page, and then ask questions via the AI agent panel 806. The AI agent is then adapted to provide responses based on the highlighted sections. A user can click and drag to highlight a specific portion of a graph. The user can then ask a question via the AI agent panel 806. Based thereon, the AI agent will answer the question while focusing on the highlighted section. For example, if the user highlights a portion of a graph and askes a question about the data within the graph, the AI agent will respond with an answer specific to the portion of the graph.

For example, responsive to a user selecting/highlighting a section of the UI, any queries made to the AI agent can be focused on data that is shown within the selected/highlighted section. Similarly, the AI agent can be adapted to automatically provide information in response to an element being selected within the UI. For example, the AI agent can provide information in response to an element being selected, i.e., in response to a data point within a graph being selected.

These methods allow the user to interact in a new way with the AI agent that has not been done before. It allows the user to simply click anywhere in the UI and the AI agent will provide contextual information about the element that the user clicked on. When the AI agent panel 806 is open, the user has the option to click on the AI agent UI input symbol (wand icon 804) next to the prompt input area 808. The user clicks on the AI agent UI input symbol (wand icon 804) to initiate "UI mode". Now that the user is in the "UI mode" of the AI agent, they are able to click on anything in the UI as an input method for the AI agent. The "UI mode" becomes active, as indicated by the UI mode symbol 810. In various embodiments, the user mouse cursor changes to a symbol indicating they are now in UI mode. The user is now able to click on anything in the UI to enter as an input for the AI agent.

Figure 19:
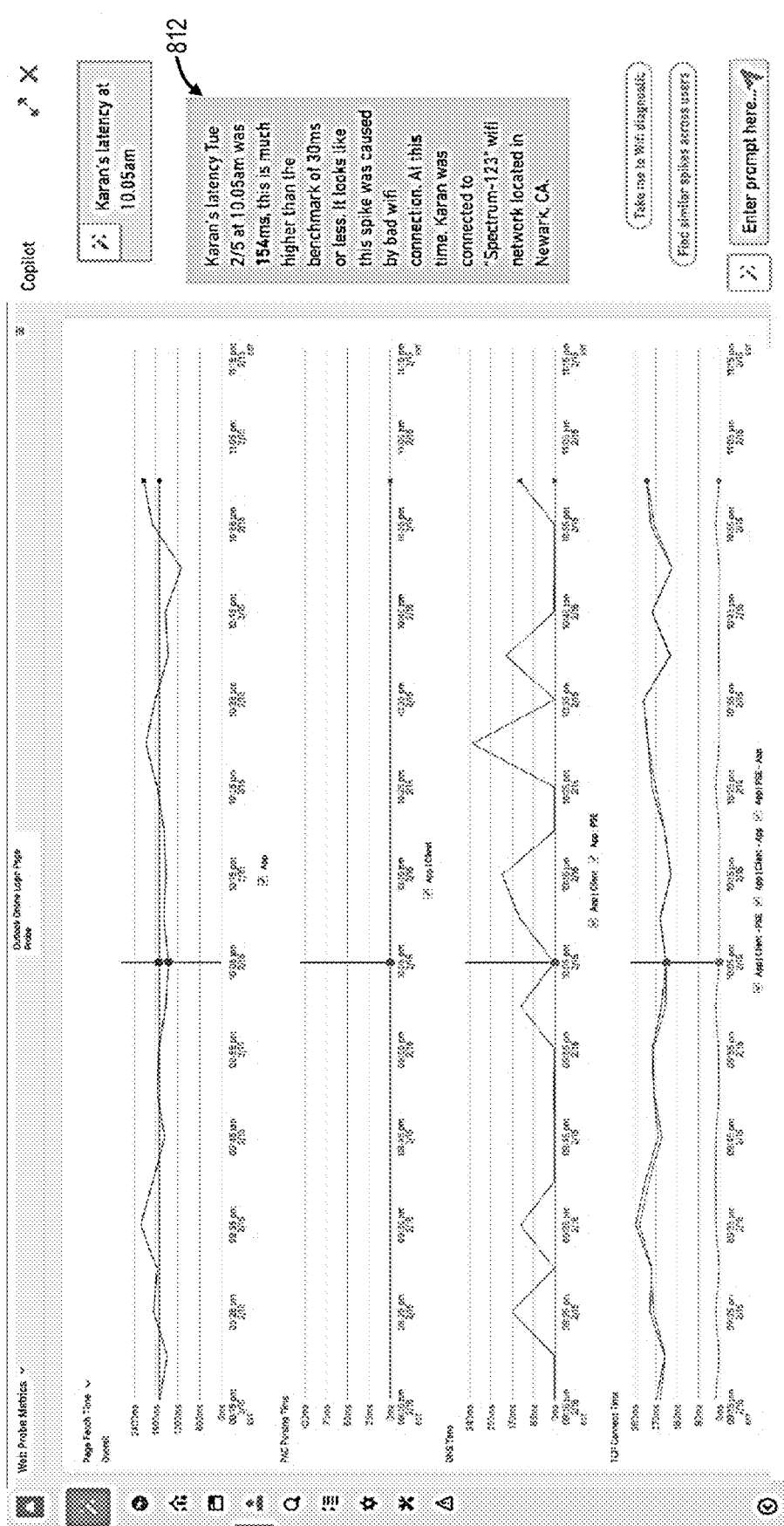
FIG. 19 is a screenshot of an example UI with the AI agent adapted to facilitate the UI-based inputs after a selection.

After the user provides an input, the AI agent now generates intelligent, contextual content that is relevant to the user. FIG. 19 is a screenshot of an example UI with the AI agent adapted to facilitate the UI-based inputs after a selection. In the example shown in FIG. 19, the user clicks on the 10:05 am mark in the graph. Based on that selection, the AI agent generates an intelligent response. Because the selection was made in a graph showing page fetch time metrics for a specific user, the AI agent provides the response 812. As stated, the response 812 includes useful information that the AI agent collects based on the various sources of data. for example, the AI agent provides a response that states the latency is higher than normal, and also provides a cause for the spike in latency. Further, the response includes a location of the user and the network to which the user was connected to during the spike. All of this data provided by the AI agent can allow administrators to quickly determine causes of issues and act quickly to resolve them.

Again, the present systems and methods allow users to provide inputs to an AI agent by directly interacting with UI elements, eliminating the need for typing text prompts. This method simplifies the troubleshooting process and enhances user experience by allowing intuitive selection of elements within the interface to generate context-specific assistance. The following provides an example scenario utilizing the present features of the AI agent.

Scenario: An IT administrator notices a high latency indicator on the network performance dashboard.

Action: The administrator enters "UI Mode" and clicks directly on the latency indicator.

Result: The AI copilot provides an analysis of the latency issue, including possible causes such as increased traffic from a specific application, hardware issues, or external factors affecting the network.

As described, upon the user's selection of a UI element, the AI agent automatically generates intelligent, context-specific information and recommendations related to the selected element, thereby improving the accuracy and relevance of the responses. Further, the invention introduces a "UI Mode" that users can easily activate and deactivate, streamlining the process of providing inputs to the copilot. This specialized mode increases the speed and efficiency of user interactions by allowing quick selection of interface elements without navigating away from the current view.

Process for AI Agent Inputs Using UIs

Figure 20:
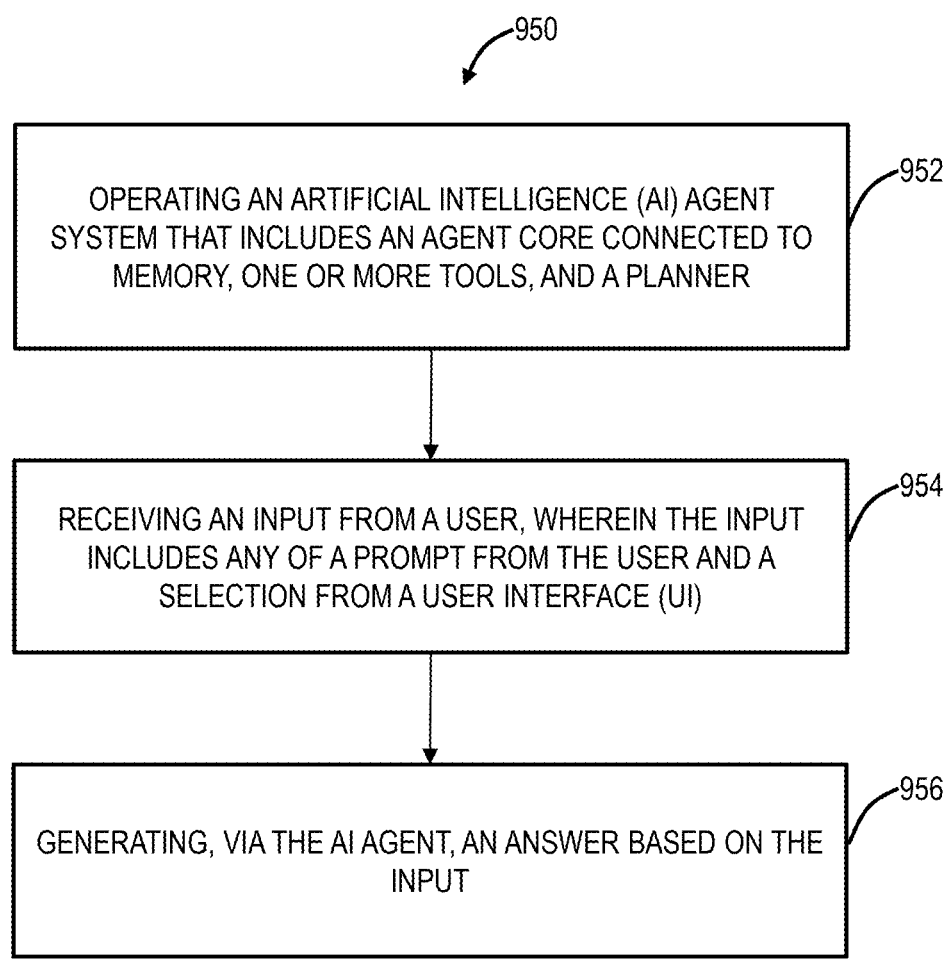
FIG. 20 is a flowchart of a process for AI agent inputs using UIs.

FIG. 20 is a flowchart of a process 950 for AI agent inputs using UIs. In various embodiments, the process 950 is contemplated as a method having steps, a processing devices configured to implement the steps, a cloud-based system configured to implement the steps, and as a non-transitory computer-readable medium storing instructions for programming one or more processors to execute the steps. The process 950 includes operating an Artificial Intelligence (AI) agent system that includes an agent core connected to memory, one or more tools, and a planner (step 952); receiving an input from a user, wherein the input includes any of a prompt from the user and a selection from a User Interface (UI) (step 954); and generating, via the AI agent, an answer based on the input (step 956).

The process 950 can further include wherein the input includes a highlighted section of the UI and a prompt from the user. The answer can be based on the highlighted section of the UI and a prompt from the user. Prior to receiving the input from the user, the steps can include displaying an AI agent UI input symbol, thereby providing the user with an option to select one or more elements within the UI as input. Responsive to the user selecting the AI agent UI input symbol, the steps can include allowing the user to select one or more elements within the UI; and generating an answer responsive to one or more elements being selected, the answer being based on the one or more elements. The answer can be specific to the one or more elements, wherein the answer includes an explanation of data associated with the one or more elements, and one or more remedial action recommendations responsive to the one or more elements being associated with an issue. The steps can further include receiving an input, the input being a highlighted section of the UI; receiving a second input, the second input being a request from the user; and generating an answer to the request based on the highlighted section of the UI.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, modules, circuits, etc. described herein contemplate use in any and all combinations with one another, including individually as well as combinations of less than all of the various elements, operations, steps, methods, processes, algorithms, functions, techniques, modules, circuits, etc.

What is claimed is:

1. A method comprising steps of:
operating an Artificial Intelligence (AI) agent system that includes an agent core connected to memory, one or more tools, and a planner;
receiving an input from a user, wherein the input includes any of a prompt from the user and a selection from a User Interface (UI);
displaying, within the UI, an AI agent UI input symbol activatable by the user to enter a UL input mode;
responsive to the activation of the AI agent UI input symbol, allowing the user to highlight or select one or more elements within the UT as part of the input; and
generating, via the AI agent, an answer based on the input, wherein the answer is specific to the highlighted or selected UI elements and includes (i) an explanation of data associated with the UI elements and (ii) one or more remedial action recommendations responsive to the UI elements being associated with an issue.

2. The method of claim 1, wherein the input includes a highlighted section of the UI and a prompt from the user.

3. The method of claim 2, wherein the answer is based on the highlighted section of the UI and a prompt from the user.

4. The method of claim 1, wherein prior to receiving the input from the user, the steps comprise displaying an AI agent UI input symbol within a user interface panel to indicate entry into a UI input mode, the UI input mode enabling the user to provide inputs by selecting elements within the UI.

5. The method of claim 4, wherein responsive to the user selecting the AI agent UI input symbol, the steps comprise:
allowing the user to select one or more graphical elements within a chart or dashboard of the UI; and
generating an answer responsive to one or more graphical elements being selected, the answer being based on the one or more elements.

6. The method of claim 5, wherein the answer is specific to the one or more elements, and wherein the answer includes an explanation of data associated with the one or more elements, and one or more remedial action recommendations, the remedial action recommendations including any of a network troubleshooting action, a device reset, or a configuration change.

7. The method of claim 1, wherein the steps comprise:
receiving an input, the input being a highlighted section of the UI;
receiving a second input, the second input being a request from the user; and
generating an answer to the request based on the highlighted section of the UI.

8. A non-transitory computer-readable storage medium having computer-readable code stored thereon for programming one or more processors to perform steps of:
operating an Artificial Intelligence (AI) agent system that includes an agent core connected to memory, one or more tools, and a planner;
receiving an input from a user, wherein the input includes any of a prompt from the user and a selection from a User Interface (UI);
displaying, within the UI, and agent UI input symbol activatable by the user to enter a UI input mode;
responsive to activation of the AI agent UI input symbol, allowing the user to highlight or select one or more elements withing the UI as part of the input; and
generating, via the AI agent, an answer based on the input, wherein the answer is specific to the highlighted or selected UI elements and includes (i) an explanation of data associated with the UI elements and (ii) one or more remedial action recommendations responsive to the UI elements being associated with an issue.

9. The non-transitory computer-readable storage medium of claim 8, wherein the input includes a highlighted section of the UI and a prompt from the user.

10. The non-transitory computer-readable storage medium of claim 9, wherein the answer is based on the highlighted section of the UI and a prompt from the user.

11. The non-transitory computer-readable storage medium of claim 8, wherein prior to receiving the input from the user, the steps comprise displaying an AI agent UI input symbol within a user interface panel to indicate entry into a UI input mode, the UL input mode enabling the user to provide inputs by selecting elements within the UI.

12. The non-transitory computer-readable storage medium of claim 11, wherein responsive to the user selecting the AI agent UI input symbol, the steps comprise:
allowing the user to select one or more graphical elements within a chart or dashboard of the UI; and
generating an answer responsive to one or more graphical elements being selected, the answer being based on the one or more elements.

13. The non-transitory computer-readable storage medium of claim 12, wherein the answer is specific to the one or more elements, and wherein the answer includes an explanation of data associated with the one or more elements, and one or more remedial action recommendations, the remedial actions recommendations including any of a network troubleshooting action, a device reset, or a configuration change.

14. The non-transitory computer-readable storage medium of claim 8, wherein the steps comprise:

receiving an input, the input being a highlighted section of the UI;

receiving a second input, the second input being a request from the user; and generating an answer to the request based on the highlighted section of the UI.

15. A cloud-based system comprising:

one or more processors; and memory storing computer-executable instructions that, when executed, cause the one or more processors to:

operate an Artificial Intelligence (AI) agent system that includes an agent core connected to memory, one or more tools, and a planner;

receive an input from a user, wherein the input includes any of a prompt from the user and a selection from a User Interface (UI);

display, within the UI, an agent UL input symbol activatable by the user to enter a UI input mode;

responsive to activation of the AI agent UI input symbol, allow the user to highlight or select one or more elements within the UI as part of the input; and generate, via the AI agent, an answer based on the input, wherein the answer is specific to the highlighted or selected UI elements and includes (i) an explanation of data associated with the UI elements and (ii) one or more remedial action recommendations responsive to the UI elements being associated with an issue.

16. The cloud-based system of claim 15, wherein the input includes a highlighted section of the UI and a prompt from the user.

17. The cloud-based system of claim 16, wherein the answer is based on the highlighted section of the UI and a prompt from the user.

18. The cloud-based system of claim 15, wherein prior to receiving the input from the user, the instructions cause the one or more processors to display an AI agent UI input symbol within a user interface panel to indicate entry into UI input mode, the UI input mode enabling the user to provide inputs by selecting elements within the UI.

19. The cloud-based system of claim 18, wherein responsive to the user selecting the AI agent UI input symbol, the instructions further cause the one or more processors to:

allow the user to select one or more graphical elements within a chart or dashboard of the UI; and generate an answer responsive to one or more graphical elements being selected, the answer being based on the one or more elements.

20. The cloud-based system of claim 19, wherein the answer is specific to the one or more elements, and wherein the answer includes an explanation of data associated with the one or more elements, and one or more remedial action recommendations, the remedial action recommendations including any of a network troubleshooting action, a device reset, or a configuration change.

* * * * *